US010812696B2

(12) United States Patent
Gantz et al.

(10) Patent No.: US 10,812,696 B2
(45) Date of Patent: *Oct. 20, 2020

(54) LIGHTING AND POWER DEVICES AND MODULES

(71) Applicant: Windy Place, Inc., Seattle, WA (US)

(72) Inventors: Cindy Gantz, Seattle, WA (US); Jackie Wallace, San Francisco, CA (US); Jean Tripier, San Francisco, CA (US)

(73) Assignee: Windy Place, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,947

(22) Filed: Jul. 24, 2019

(65) Prior Publication Data

US 2020/0021725 A1 Jan. 16, 2020

Related U.S. Application Data

(63) Continuation of application No. 15/914,910, filed on Mar. 7, 2018, now Pat. No. 10,397,460, which is a
(Continued)

(51) Int. Cl.
*H04N 5/225* (2006.01)
*A45C 11/00* (2006.01)
(Continued)

(52) U.S. Cl.
CPC ........... *H04N 5/2256* (2013.01); *A45C 11/00* (2013.01); *G03B 15/03* (2013.01); *H04B 1/3888* (2013.01);
(Continued)

(58) Field of Classification Search
None
See application file for complete search history.

(56) References Cited

U.S. PATENT DOCUMENTS 6,435,690 B1 8/2002 Till
7,612,997 B1 * 11/2009 Diebel .................. G06F 1/1632
361/679.41
(Continued)

FOREIGN PATENT DOCUMENTS

CN 2678271 2/2005
JP 2008-286935 11/2008
(Continued)

OTHER PUBLICATIONS

U.S. Appl. No. 13/981,583, filed Nov. 7, 2013, Gantz.
(Continued)

*Primary Examiner* — William B Perkey
(74) *Attorney, Agent, or Firm* — Fish & Richardson P.C.

(57) ABSTRACT

Electronic device cases and lighting and power devices and modules are described. A case for a portable electronic device may include a rim portion defining an opening for a display of the portable electronic device and one or more light sources adjacent to the rim portion. A lighting device may include one or more light sources for illuminating a user's face during use of a camera of a portable electronic device, and a power member for providing power to the one or more light sources. A lighting module may include a plurality of lighting devices. A power module having a battery may be configured to provide power to a portable electronic device.

14 Claims, 19 Drawing Sheets

Related U.S. Application Data continuation of application No. 15/242,289, filed on Aug. 19, 2016, now Pat. No. 9,930,235, which is a continuation of application No. 13/981,583, filed as application No. PCT/US2012/023180 on Jan. 30, 2012, now Pat. No. 9,442,346.

(60) Provisional application No. 61/501,100, filed on Jun. 24, 2011, provisional application No. 61/437,572, filed on Jan. 28, 2011.

(51) Int. Cl.
*H04B 1/3888* (2015.01)
*G03B 15/03* (2006.01)
*H04N 5/232* (2006.01)
*H04N 5/04* (2006.01)

(52) U.S. Cl.
CPC .... *A45C 2011/002* (2013.01); *G03B 2215/05* (2013.01); *G03B 2215/0575* (2013.01); *H04N 5/04* (2013.01); *H04N 5/23216* (2013.01); *H04N 5/23241* (2013.01); *H04N 5/23293* (2013.01)

(56) References Cited

U.S. PATENT DOCUMENTS

| | | | |
|---|---|---|---|
| 7,632,979 B2 | 12/2009 | Fujii | |
| 7,782,610 B2 | 8/2010 | Diebel | |
| D634,313 S | 3/2011 | Fitzpatrick | |
| 8,139,122 B2 | 3/2012 | Rolston | |
| 8,428,644 B1 | 4/2013 | Harooni | |
| 8,625,023 B2 | 1/2014 | Rolston | |
| 8,692,930 B2 | 4/2014 | Rolston | |
| 9,086,610 B2 | 7/2015 | Shoemake | |
| 9,247,130 B2 | 1/2016 | Rolston | |
| 9,247,149 B2 | 1/2016 | Rolston | |
| 9,247,151 B2 | 1/2016 | Rolston | |
| 9,442,346 B2 * | 9/2016 | Gantz | H04N 5/2256 |
| 9,521,332 B2 | 12/2016 | Rolston | |
| 9,930,235 B2 * | 3/2018 | Gantz | A45C 11/00 |
| 10,397,460 B2 * | 8/2019 | Gantz | H04N 5/2256 |
| 2003/0164881 A1 | 9/2003 | Ohe | |
| 2004/0239799 A1 | 12/2004 | Suzuki | |
| 2006/0274493 A1 | 12/2006 | Richardson | |
| 2007/0139515 A1 | 6/2007 | Du Beruil | |
| 2008/0002982 A1 | 1/2008 | Hsueh | |
| 2009/0136225 A1 | 5/2009 | Gai | |
| 2009/0181729 A1 | 7/2009 | Griffin | |
| 2011/0117959 A1 | 5/2011 | Rolston | |
| 2011/9185753 | 8/2011 | Mock | |
| 2011/0287726 A1 | 11/2011 | Huang | |
| 2012/0023180 A1 | 1/2012 | Gantz | |
| 2012/0282977 A1 | 11/2012 | Haleluk | |
| 2012/0302294 A1 | 11/2012 | Hammond | |
| 2014/0200054 A1 | 7/2014 | Fraden | |
| 2014/0340573 A1 | 11/2014 | Clawson | |
| 2015/0180527 A1 | 6/2015 | Fathollahi | |
| 2015/0276187 A1 | 10/2015 | Shoemake | |
| 2016/0044227 A1 | 2/2016 | Johnson | |
| 2017/0054885 A1 | 2/2017 | Rolston | |

FOREIGN PATENT DOCUMENTS

| | | |
|---|---|---|
| KR | 20-0303644 | 2/2003 |
| KR | 10-2003-0054947 | 7/2003 |
| KR | 10-2007-0022903 | 2/2007 |
| KR | 20-2009-0001494 | 2/2009 |

OTHER PUBLICATIONS

U.S. Appl. No. 15/242,289, filed Aug. 19, 2016, Gantz.
CES2010: iPhone Case With a Built-in LED Light From Quirky. Jan. 12, 2010. 3 pages. http://www.funkyspacemonkey.com/ces2010-iphone-case-builtin-led-lightquirky.
U.S. Appl. No. 61/437,572, filed Jan. 28, 2011, Gantz.
U.S. Appl. No. 61/501,100, filed Jun. 24, 2011, Gantz.
CRAFT. Enlighten Yourself: New Technology for Looking Better on Skype. Apr. 11, 2011. 2 pages.
International search report and written opinion dated Sep. 25, 2012 for PCT /US2012/023180.
International Preliminary Report on Patentability of PCT/US2012/023180 dated Jul. 30, 2013.

* cited by examiner

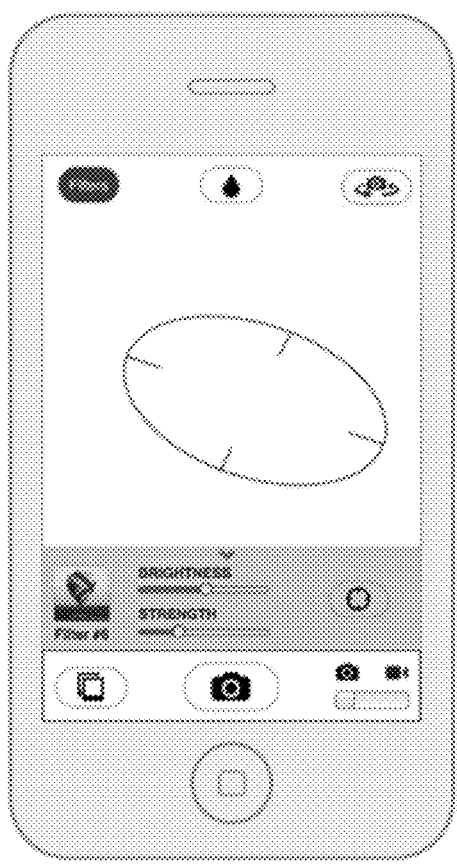 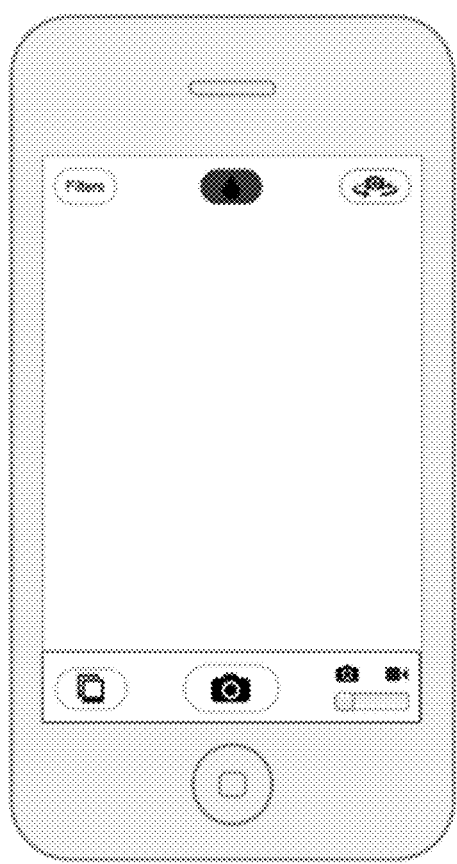
*FIG. 15E*  *FIG. 15F*

LIGHTING AND POWER DEVICES AND MODULES

CROSS-REFERENCE

This application is a continuation of U.S. patent application Ser. No. 15/914,910, filed Mar. 7, 2018, which is a continuation of U.S. patent application Ser. No. 15/242,289, filed Aug. 19, 2016 (now U.S. Pat. No. 9,930,235), which is a continuation of U.S. patent application Ser. No. 13/981,583, filed Nov. 7, 2013 (now U.S. Pat. No. 9,442,346), which is a § 371 National Phase of PCT Application No. PCT/US2012/023180, filed Jan. 30, 2012, which claims priority to Provisional Patent Application Ser. No. 61/437,572, filed Jan. 28, 2011, and U.S. Provisional Patent Application Ser. No. 61/501,100, filed Jun. 24, 2011, which are entirely incorporated herein by reference.

BACKGROUND OF THE INVENTION

Portable electronic devices may include personal digital assistants (PDAs), computers, smart phones, mobile phones, satellite phones, cellular phones, pagers, music players, MP3 players, media players, digital cameras, video cameras, bar code scanners, global positioning systems (GPS), and portable game consoles. Typically, such devices are battery powered, enabling users to carry and use the devices while moving or traveling from one point to another (e.g., on a bus or train, while in flight on an airplane, at the gym on the stair stepper, walking from one point to another, riding a bike, or driving a car). Portable electronic devices may allow users to play and record music, send and receive e-mail, send and receive text messages, browse Web pages, have telephone conversations, play and record video, take and view pictures, edit documents, and much more.

Users may protect their portable electronic devices with cases that protect a back portion, side portion, and front portion of the devices from scratches, dings, drops, and other physical damage. Cases may be formed of a material for absorbing shock upon impact with another object. In some situations, cases may be formed of rubber or rubber-like material.

A camera is a device that records or stores images. These images may be still photographs or moving images, such as videos or movies. Cameras may function with visible light from the electromagnetic spectrum of light, or with other portions of the electromagnetic spectrum of light.

SUMMARY OF THE INVENTION

An aspect of the invention provides a case for electronic device, the case having one or more light sources. Cases may be formed of polymeric materials, such as rubber or a plastic, or a composite material, which may include metals and/or polymeric materials.

A case for a portable electronic device can include a rim portion defining an opening for a display of the portable electronic device, and one or more light sources adjacent to the rim portion, the one or more light sources for providing light at an illuminance of at least 1 lumen per square meter ("lux").

The case for the portable electronic device can have a display and a front-facing camera. The case can comprise a back portion for resting against a back surface of the portable electronic device; and a front portion having a rim defining an opening for a display and a front-facing camera of the portable electronic device, the front portion having one or more light sources thereon for illuminating an object to be captured by the front-facing camera (e.g., a user's face) when using the front-facing camera.

Another aspect of the invention provides a lighting device for a portable electronic device. The lighting device can enable a user to provide light while taking a picture or video using a front-facing camera of the portable electronic device. In some cases, the lighting device can be adapted for use with a back-facing camera of the portable electronic device.

Another aspect of the invention provides a case for a portable electronic device having a display and a front-facing camera, comprising: a case portion. The case portion comprises a base portion for resting against a lower portion of the portable electronic device; a lower sidewall connected to the base portion, the lower sidewall for resting against a bottom side edge of the portable electronic device; a rim portion at least partially defining an opening for the display and front-facing camera of the portable electronic device; and one or more light sources adjacent to the opening. In an embodiment, the case further comprises an another case portion, comprising: a roof portion for resting against a top portion of the portable electronic device; an upper sidewall connected to the roof portion, the upper sidewall for resting against a top side edge of the portable electronic device; and a second rim portion partially defining an upper portion of the opening for the display and front-facing camera of the portable electronic device. The another case portion slides onto the portable electronic device.

Another aspect of the invention provides a lighting device for a portable electronic device having a display adjacent to a front-facing camera of the portable electronic device. The lighting device comprises one or more light sources for emitting light away from the display, the one or more light sources for emitting light at an illuminance of at least 1 lumen per square meter (lux). In an embodiment, the one or more light sources are for emitting light at an illuminance of at least 10 lux, or at least 100 lux, or at least 1,000 lux, or at least 10,000 lux. In another embodiment, the lighting device is configured for over the air communication with the portable electronic device.

The lighting device can be include a jack connector for mating with a socket connector of a portable electronic device; a lighting member electrically coupled to the jack connector; and a connector electrically coupled to the jack connector, the connector for mating with another lighting device. Lighting devices can be coupled to one another in series and/or parallel to form lighting modules.

Another aspect of the invention provide a lighting device for a portable electronic device, the portable electronic device having a display and a camera, the lighting device comprising one or more light sources for illuminating an object to be imaged during use of the camera, the one or more light sources for providing light at an illuminance of at least 1 lumen per square meter (lux); and a power member for providing power to the one or more light sources. The lighting device is for mounting a display of the portable electronic device. In an embodiment, the one or more light sources include light emitting diodes. In another embodiment, the one or more light sources are for providing light at an illuminance of at least 10 lux, or at least 100 lux, or at least 1,000 lux, or at least 10,000 lux. In another embodiment, the power member is for mating with a power source of the portable electronic device. In another embodiment, the power member is for mating with a serial bus of the portable electronic device. In another embodiment, the serial bus is selected from Universal Serial Bus and FireWire. In another embodiment, the object to be imaged includes the face of a user.

Another aspect of the invention provides a lighting device, comprising a jack connector for mating with a socket connector of a portable electronic device; a lighting member electrically coupled to the jack connector; and a connector electrically coupled to the jack connector, the connector for mating with another lighting device. In an embodiment, the lighting device further comprises a battery in electrical communication with the jack connector. In another embodiment, the lighting device further comprises a socket connector for mating with a jack connector. In another embodiment, the lighting device further comprises a switch in electrical communication with the jack connector. In another embodiment, the lighting member is a light emitting diode.

Another aspect of the invention provides a power device comprising a jack connector for mating with a socket connector of a portable electronic device; and a battery electrically coupled to the jack connector. The battery is for providing power to or receiving power from a portable electronic device through the jack connector. In an embodiment, the power device further comprises a switch electrically coupled to the battery. In another embodiment, the power device further comprises a socket for mating with a jack connector. In another embodiment, the power device further comprises a connector for coupling to another power device or a lighting device.

In some cases, multiple power devices can be connected to one another in series and/or parallel to form power modules. In some cases, power devices can be connected to lighting devices.

Another aspect of the invention provides a system for image or video capture, comprising an electronic device having a camera and a display; and a lighting device coupled to the electronic device, the lighting device for providing light enhancement to an object to be captured by said camera. In an embodiment, the lighting device is separable from said electronic device. In another embodiment, the display includes a user interface for displaying said object to be captured by said camera. In another embodiment, the user interface is configured to synchronize the supply of power to said lighting device with image or video capture by said camera. In another embodiment, the user interface is a graphical user interface.

Another aspect of the invention provides a method for mounting a case on an electronic device, comprising providing a case or lighting device as described above, alone or in combination, and mounting the case or lighting device on a portable electronic device.

Another aspect of the invention provides a lighting system for a portable electronic device, comprising a case or lighting device as described above, alone or in combination, mounted on a portable electronic device.

Another aspect of the invention provides a system for image or video capture, comprising a user interface implemented via machine-executable code stored on a memory location of a portable electronic device, wherein said user interface interfaces with a lighting device attached to said portable electronic device. The lighting device in some cases is removably (or separably) attached to said portable electronic device. In some situations, the user interface is a graphical user interface.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figures" and "FIG." herein) of which:

FIGS. 15A-15G show examples of user interfaces, as can be used with lighting modules and systems provided herein, in accordance with an embodiment of the invention.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The term "lighting member," as used herein, refers to a light source. A lighting member is an electronic device or a component of an electronic device configured to emit electromagnetic radiation ("light"), such as visible, infrared and/or ultraviolet light. In some embodiments, a lighting member is selected from the group consisting of incandescent lamp, fluorescent lamp, compact fluorescent lamp, cold cathode fluorescent lamp (CCFL), high-intensity discharge lamp and light-emitting diode (LED). In an example, a lighting member is formed on a circuit board of a device configured to communication with a portable electronic device, such as via over the air ("OTA") communication. In some situations, a lighting member is configured to emit visible light of at least about 1 lux, or at least about 2 lux, or at least about 3 lux, or at least about 4 lux, or at least about 5 lux, or at least about 6 lux, or at least about 7 lux, or at least about 8 lux, or at least about 9 lux, or at least about 10 lux, or at least about 50 lux, or at least about 100 lux, or at least about 500 lux, or at least about 1,000 lux, or at least about 50,000 lux, or at least about 10,000 lux.

The term "lighting device," as used herein, refers to an electronic device or system having one or more lighting members.

When a user uses a front-facing camera, the lighting conditions are often not adequate or ideal. Adjusting the lighting may provide for a more visible image or enhance the quality of the image, which in some cases may be similar to the way cosmetics enhance a person's appearance. Cases and lighting devices for portable electronic devices may enhance or adjust lighting conditions for a user when using a camera of a portable electronic device to take a picture, movie or video when using a front-facing camera. An application on a portable electronic device may provide lighting to enhance lighting conditions ("In app lighting"). Adequate or ideal lighting conditions may permit the user or other subject (e.g., another user) to enhance the quality of the picture, movie or video by providing more cosmetic lighting conditions.

Reference will now be made to the figures. It will be appreciated that the figures and structures therein are not necessarily drawn to scale.

Figure 1:
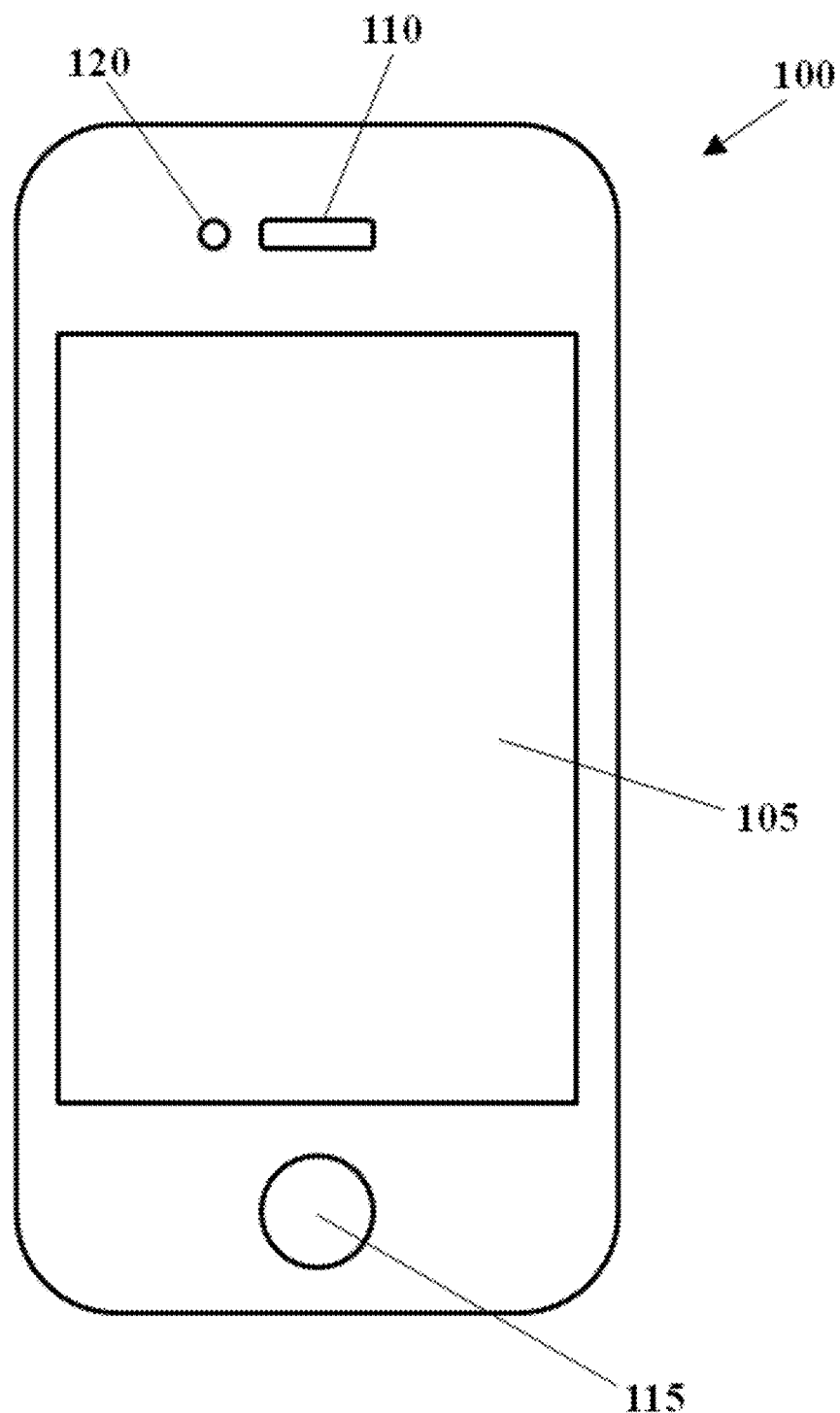
FIG. 1 is a schematic front view of an electronic device, such as, for example, an Apple® iPhone®.

FIG. 1 shows a portable electronic device 100 having a display 105, earpiece 110, access button 115 and camera 120. The portable electronic device 100 can be a Smart phone (e.g., iPhone), tablet PC (e.g., Apple iPad), or music player (e.g., Apple iPod touch). The portable electronic device 100 can have a front-facing camera. The access button 115 may be for accessing one or more features of the device 100, such as a home screen of the user interface ("UI") of the device 100. The earpiece 110 permits a user to communicate with another user in a telephonic conversation. The camera 120 is disposed in a front portion of the electronic device 100 (i.e., "front-facing" camera). The camera 120 is at a front side of the device 100, the front side having the display 105. The camera 120 is configured to face a user when the user is viewing the display 105. The device 100 may include a camera (in addition to or in place of the camera 120) at a side of the device 100 opposite from the side having the camera 120. In some cases, the device 100 may include a camera on a back side of the device 100, which may permit a user to take a picture or video of other objects, including other users. In such a case, the display 105 may permit the user to take a desirable picture of an object. Device may allow for over the air communication ("OTA communication") to other mobile devices and/or hardware components. Such OTA communication may use standards, such as Bluetooth, various WiFi protocols, infrared, etc.

With continued reference to FIG. 1, the portable electronic device 100 may enable a user to use "FaceTime" or any other application (e.g., Skype, Tango) to have a video conversation with another user. For example, the first user may use the portable electronic device 100 to have a video conversation (or "video chat" or "video conference call") with a second or more users. During the conversation, the first user may see the second or more users in the display 105, and the camera 120 may permit the second and any other user to see the first user. Additionally, the device 100 may enable a user to take a picture or video of herself or himself. For example, the user may bring the user's face in line of sight with, or within the scope of, the camera 120. The display 105 may permit the user to adjust and orient the device 100 and the user's image in the display 105, as desired. The user may then take a picture or video of herself or himself with the aid of the camera 120.

Although device 100 with front-facing camera 120 has various advantages, there are limitations associated with such a device. For example, any lighting provided by the display 105 upon a user taking a picture or video of the user may be inadequate in locations in which ambient lighting is poor. Poor lighting for the front-facing camera (such as camera 120 of FIG. 1) may lead to poor image quality. In some cases, the image quality may not be adequate to permit clear recognition of one or more users in the image. In addition, if a user desires to use the portable electronic device 100 with front-facing camera 120 for cosmetic or grooming purposes, such as for applying makeup to the user's face or to trim the user's facial hairs, the user may experience difficulty, as the lighting provided by the portable electronic device 100, including the screen of the portable electronic device 100, may be inadequate. The lighting may not be very flattering or appropriate for capturing portraits. In addition, any lighting that may be provided by the screen of the portable electronic device may make it difficult for the user to view the user's face during use. There is thus a need for improved lighting methods for portable electronic devices having front-facing cameras, such as electronic device 100.

Cases, lighting devices and lighting modules provided herein may advantageously provide improved lighting conditions for portable electronic devices having front-facing cameras, such as the portable electronic device 100 of FIG. 1. In some situations, cases, lighting devices and lighting modules improve the manner in which one user interacts with another user via a portable electronic device equipped with a camera. Devices provided herein may provide for improved portraits and videos.

In embodiments, cases having light sources are provided for protecting a portable electronic device while lighting a user (or any other object) in front of a front-facing camera of the portable electronic device.

Cases for Portable Electronic Devices

In an aspect of the invention, a case for a portable electronic device is provided. In one embodiment, the case comprises a rim portion defining an opening for a display of the portable electronic device, and one or more light sources adjacent to the rim portion, the one or more light sources for providing light.

The one or more light sources may be for providing visible light. In one embodiment, the one or more light sources may be for providing visible light at an illuminance of at least 1 lumen per square meter (lux). In another embodiment, the one or more light sources may be for providing infrared (IR) light or ultraviolet (UV) light. In another embodiment, the one or more light sources may be for providing one or more of IR, UV and visible light.

The one or more light sources may be for providing light at an illuminance of at least about 1 lux, or at least about 2 lux, or at least about 3 lux, or at least about 4 lux, or at least about 5 lux, or at least about 6 lux, or at least about 7 lux, or at least about 8 lux, or at least about 9 lux, or at least about 10 lux, or at least about 50 lux, or at least about 100 lux, or at least about 500 lux, or at least about 1,000 lux, or at least about 50,000 lux, or at least about 10,000 lux.

A case may include any number of light sources. In one embodiment, the case may include 1 or more, or 2 or more, or 3 or more, or 4 more, or 5 or more, or 6 or more, or 7 or more, or 8 or more, or 9 or more, or 10 or more, or 15 or more, or 20 or more or 30 or more, or 40 or more, or 50 or more, or 100 or more, or 1000 or more light sources. The light sources may be disposed or situated in various configurations. For example, the light sources may be distributed in a plurality of groups of light sources, such as a group of light sources at a top portion of the case and a group of light sources at a bottom of the case. The light sources may be evenly placed around the case.

In some situations, a light source may be glued to a case, such as a rim portion of a case. In another embodiment, a light source may be embedded in a case. In other situations, a light source may be provided in an impression or hole formed in a case, the impression or hole having a shape and size for securing the light source. Alternatively, the case may be formed of a material of the light source. As another alternative, if a light source includes a light emitting diode (LED) or organic LED (OLED), the case may be formed of a semiconductor or semiconductor-containing material, and the light source may be formed directly in the case.

In one embodiment, a case for a portable electronic device having a display and a front-facing camera comprises a back portion for resting against a back surface of the portable electronic device, and a front portion having a rim defining an opening for a display and a front-facing camera of the portable electronic device, the front portion having one or more light sources thereon for illuminating a user's face during use of the front-facing camera.

A case for a portable electronic device having a display and a front-facing camera may comprise a first case portion and a second case portion. The first case portion may include a base portion for resting against a lower portion of the portable electronic device. The first case portion may further include a lower sidewall connected to the base portion, the lower sidewall for resting against a bottom side edge of the portable electronic device. The first case portion may further include a rim portion at least partially defining an opening for the display and front-facing camera of the portable electronic device, and one or more light sources adjacent to the opening. The second case portion may include a roof portion for resting against a top portion of the portable electronic device. The second case portion may further include an upper sidewall connected to the roof portion, the upper sidewall for resting against a top side edge of the portable electronic device, and a second rim portion partially defining an upper portion of the opening for the display and front-facing camera of the portable electronic device.

The first case portion, the second case portion, or both may be configured to slide onto a portable electronic device. In some cases, the second case portion may be configured to mate with the first case portion. For example, the first case portion may couple to the second case portion to define a case.

Figure 2:
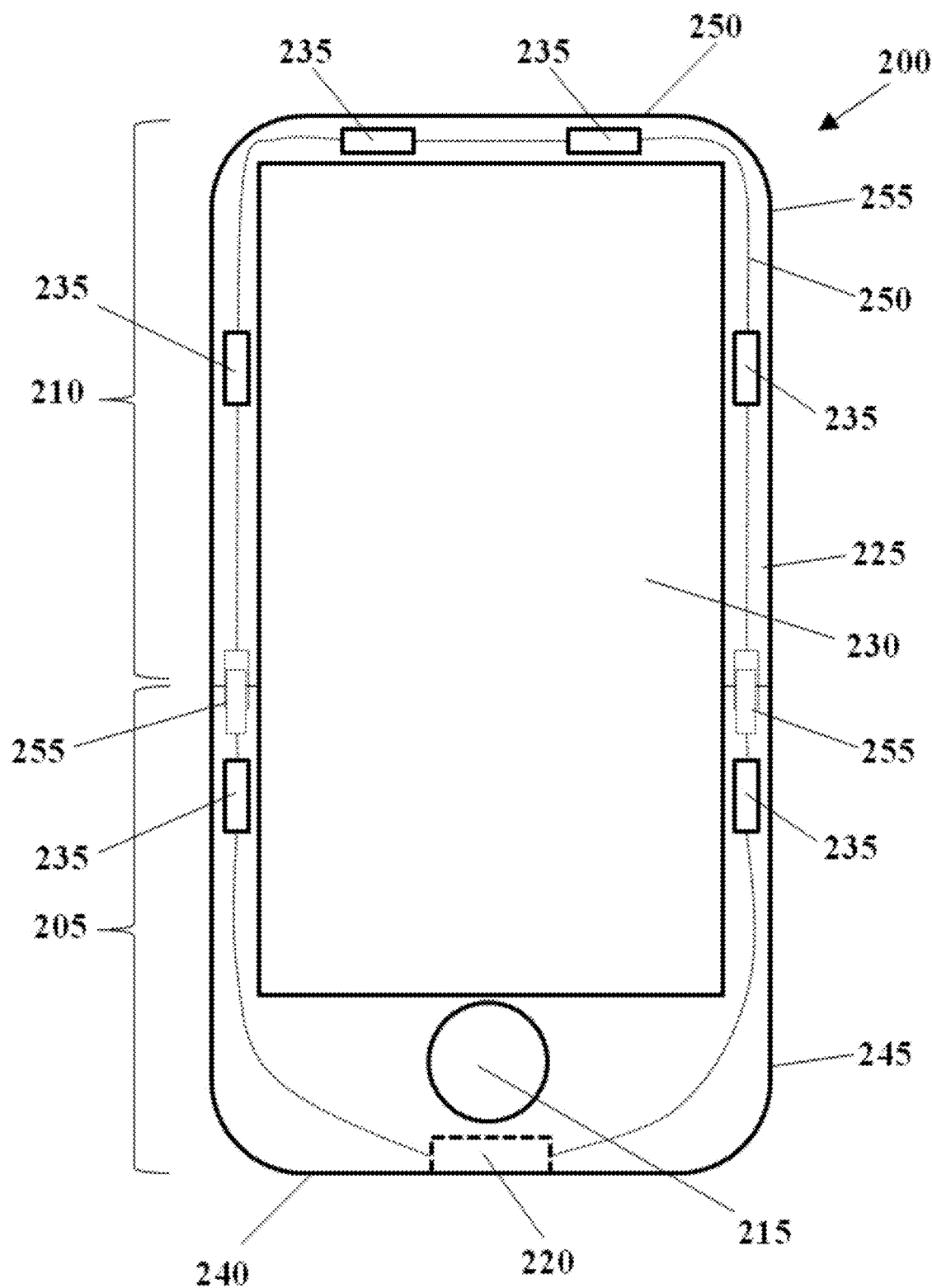
FIG. 2 is a schematic front view of a case for a portable electronic device, in accordance with an embodiment of the invention.

With reference to FIG. 2, a case 200 is shown for mounting a portable electronic device, such as the portable electronic device 100 of FIG. 1, in accordance with an embodiment of the invention. The case 200 includes a first case portion 205 and second case portion 210, a hole 215 for permitting a user to access an access button of a portable electronic device mounted by the case 200 (such as, e.g., the access button 115 of FIG. 1), a connector 220 for mating with an electronic interface (or power source) of the portable electronic device, and a rim portion 225. The first case portion 205 may be a first half of the case 200, and the second case portion 205 may be a second half of the case. The rim portion 225 defines an opening 230 of the case 200, the opening 230 for permitting a user to view a display of the portable electronic device, such as, e.g., the display 105 of the device 100 of FIG. 1. The connector 220 may be disposed at a lower portion of a cavity of the case 200, the cavity sized and/or having a geometry for accepting a portable electronic device (e.g., the portable electronic device may be able to freely slide into and out of the cavity). The cavity may be defined by a front portion and back portion of the case 200, the front portion for coming in contact with or resting against (or in proximity to) a front surface of a portable electronic device, the back portion for coming in contact with or resting against (or in proximity to) a back surface of the portable electronic device.

The case 200 may include a plurality of light sources for illuminating one or more objects in line of sight of the light sources. In the illustrated embodiment, the case 200 includes six light sources 235 on the rim portion 225 and around the opening 230. In one embodiment, the light sources 235 may be light emitting diodes (LEDs). In another embodiment, the light sources 235 may be organic LEDs (OLEDs).

The first case portion 205 may include a base portion 240 for resting against a lower portion of a portable electronic device, and a lower sidewall 245 connected to the base portion 240, the lower sidewall 245 for resting against a bottom side edge of the portable electronic device. A portion of the rim portion 225 disposed in the first case portion 205 partially defines the opening 230. The second case portion 210 includes a roof portion 250 for resting against a top portion of the portable electronic device, and an upper side wall 255 connected to the roof portion 250 for resting against a top side edge of the portable electronic device. A portion of the rim portion 225 disposed in the second case portion 210 partially defines the opening 230. With the first case portion 205 and second case portion 210 mounted on a portable electronic device (such as, e.g., portable electronic device 100 of FIG. 1), the portions of the rim portion 225 collectively define the opening 230.

The case 200 may be formed from a polymeric material (e.g., plastic, silicone), rubber (or a rubber-like) material, one or more metals, a composite material, or any combination thereof. For example, the case 200 may be formed of plastic or rubber. As another example, the case 200 may be formed of aluminum.

With continued reference to FIG. 2, the light sources 235 may be in electrical contact with the connector 220. In one embodiment, the light sources may be wired in a serial fashion to the connector 220. In another embodiment, the light sources 235 may be wired in a parallel fashion to the connector 220. The connector 220 may be configured to mate with an electronic interface of a portable electronic device (e.g., iPhone®, iPad®) mounted by the case 200. In such a case, the portable electronic device may provide power to the light sources, which may enable a user to illuminate a user's face (or provide other lighting) for taking a picture or capturing a video with the aid of a front-facing camera of the portable electronic device (see FIG. 1).

As an example, the light sources 235 may be wired in series with the aid of wires 250. As illustrated, the wires 250 are connected to the connecter 220 in series. At each junction between the first and second case portions 205 and 210, an interface 255 (one on each side of the case 200) may permit a closed circuit when the first and second case portions 205 and 210 are mounted on a portable electronic device (and brought in close proximity to one another). The interface 255 may include a first metallic material (top) having a port to accept a second metallic material (bottom). The wires 250 and interfaces 255, as illustrated, are hidden from view (e.g., the wires may be disposed in the cavity of the case 200). It will be understood, however, that other approaches to forming a closed circuit are possible. In addition, it will be understood that the light sources 235 may be wired to the connector 220 in parallel (e.g., a wire may extend from the connector 220 to each of the light sources).

The light sources 235 may provide (or emit) light at an illuminance of at least 1 lux, or at least 2 lux, or at least 3 lux, or at least 4 lux, or at least 5 lux, or at least 6 lux, or at least 7 lux, or at least 8 lux, or at least 9 lux, or at least 10 lux, or at least 50 lux, or at least 100 lux, or at least 500 lux, or at least 1,000 lux, or at least 50,000 lux, or at least 10,000 lux.

While the case 200, as illustrated, includes six light sources 235, the case 200 may include any number of light sources 235. The case 200 may include 1 or more, or 2 or more, or 3 or more, or 4 more, or 5 or more, or 6 or more, or 7 or more, or 8 or more, or 9 or more, or 10 or more, or 15 or more, or 20 or more or 30 or more, or 40 or more, or 50 or more, or 100 or more, or 1000 or more light sources. Further, the light sources 235 may be distributed in any configuration, such as, for example, a configuration for optimizing picture or video lighting conditions for a user. For example, the light sources 235 may be distributed on the second case portion 210. As another example, the light sources 235 may be distributed entirely on the first case portion 205.

While the light source 235, as illustrated, are rectangular, in other embodiments, the light sources 235 may have other shapes and sizes. For example, the light sources 235 may have one or more shapes selected from circular, triangular, square, rectangular, pentagonal, hexagonal, heptagonal, octagonal.

The light sources 235 may emit light having any of a variety of colors. For example, the light sources 235 may emit white or nearly white light, red light, green light, blue light, yellow light, orange light. In some embodiments, the light sources 235 may emit light having one or more colors selected from white, blue, green, yellow, orange, red, indigo, or violet. For example, the light sources may emit green and yellow light. As another example, a portion of the light sources may emit a first color (e.g., orange), and a remaining portion of the light sources may emit light of a second color (e.g., blue). Alternatively, the light sources 235 may emit infrared ("IR") or ultraviolet ("UV") light.

With continued reference to FIG. 2, with the case 200 dismounted from a portable electronic device, the first case portion 205 and the second case portion 210 may be separate case portions. The first and second case portions 205 and 210 may have electrical connectors (not shown) for creating an electric circuit having the light sources 235, the electrical connectors configured to mate with one another when the first and second case members 205 and 210 are mounted on a portable electronic device.

As an alternative, a case for a portable electronic device may have no case portions (i.e., the case may be single-piece) or two or more case portions. For example, a case may be a single piece without any case portions. As another example, a case may have 2 or more, or 3 or more, or 4 or more, or 5 or more case portions.

Figure 3:
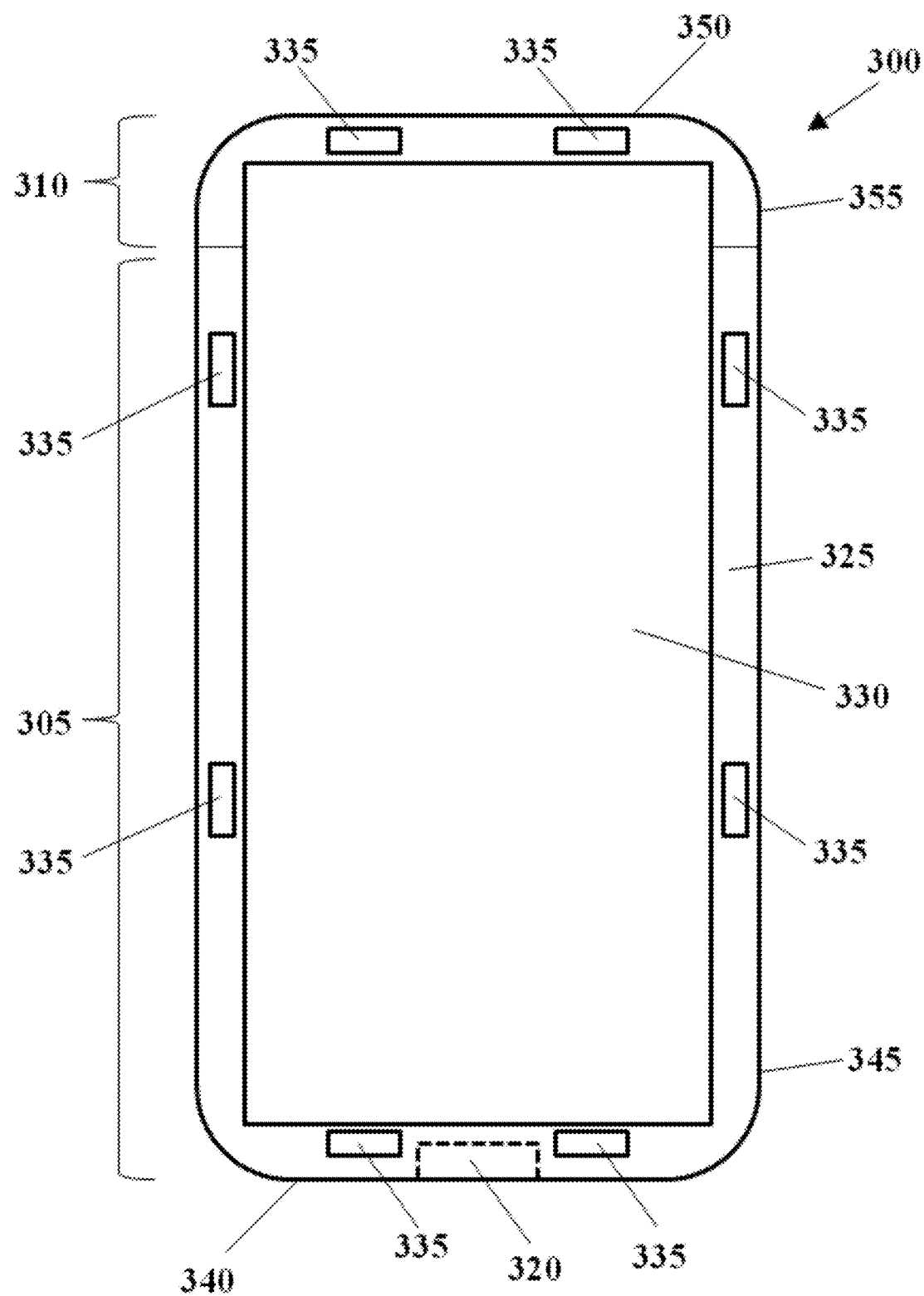
FIG. 3 is a schematic front view of a case for a portable electronic device, in accordance with one embodiment.

If a case includes two or more case portions, the case portions may have different sizes an configurations. FIG. 3 shows a case 300 having case portions of different sizes. With reference to FIG. 3, the case 300 is for mounting a portable electronic device, such as the portable electronic device 100 of FIG. 1, in accordance with an embodiment of the invention. The case 300 includes a first case portion 305 and second case portion 310, a connector 320 for mating with an electronic interface (or power source) of the portable electronic device, and a rim portion 325. The rim portion 325 defines an opening 330 of the case 300, the opening 330 for permitting a user to view a display of the portable electronic device, such as, e.g., the display 105 of the device 100 of FIG. 1. The connector 320 is disposed at a lower portion of a cavity of the case 300, the cavity for accepting a portable electronic device. The cavity may be defined by a front portion and back portion of the case 300, the front portion for coming in contact with or resting against (or in proximity to) a front surface of a portable electronic device, the back portion for coming in contact with or resting against (or in proximity to) a back surface of the portable electronic device.

With continued reference to FIG. 3, the case 300 may include a plurality of light sources for illuminating one or more objects in line of sight of the light sources. In the illustrated embodiment, the case 300 includes eight light sources 335 on the rim portion 325 and around the opening 330. In one embodiment, the light sources 335 may be light emitting diodes (LEDs). In another embodiment, the light sources 335 may be organic LEDs (OLEDs).

The first case portion 305 may include a base portion 340 for resting against a lower portion of a portable electronic device (e.g., iPhone®, Android-enabled phone), and a lower sidewall 345 connected to the base portion 340, the lower sidewall 345 for resting against a bottom side edge of the portable electronic device. A portion of the rim portion 325 disposed in the first case portion 305 partially defines the opening 330. The second case portion 310 may include a roof portion 350 for resting against a top portion of the portable electronic device, and an upper side wall 355 connected to the roof portion 350 for resting against a top side edge of the portable electronic device. A portion of the rim portion 325 disposed in the second case portion 310 partially defines the opening 330. With the first case portion 305 and second case portion 210 mounted on a portable electronic device (such as, e.g., electronic device 100 of FIG. 1), the portions of the rim portion 325 collectively define the opening 330.

In one embodiment, the case 300 may be formed from a polymeric material (e.g., plastic), rubber (or rubber-like) material, metal, a composite material, or any combination thereof. In another embodiment, the case 300 may be formed of a polymeric material.

With continued reference to FIG. 3, the light sources 335 are in electrical contact with the connector 320. In one embodiment, the light sources may be wired in a serial fashion to the connector 320. In another embodiment, the light sources 335 may be wired in a parallel fashion to the connector 320. The connector 320 may be configured to mate with an electronic interface of a portable electronic device mounted by the case 300. In such a case, the portable electronic device may provide power to the light sources, which may enable a user to illuminate a user's face upon taking a picture or capturing a video with the aid of a front-facing camera of the portable electronic device (see FIG. 1).

In one embodiment, the light sources 335 may provide light at an illuminance of at least about 1 lux, or at least about 2 lux, or at least about 3 lux, or at least about 4 lux, or at least about 5 lux, or at least about 6 lux, or at least about 7 lux, or at least about 8 lux, or at least about 9 lux, or at least about 10 lux, or at least about 50 lux, or at least about 100 lux, or at least about 500 lux, or at least about 1,000 lux, or at least about 50,000 lux, or at least about 10,000 lux.

While the case 300, as illustrated, may include eight light sources 335, in other embodiments, the case 300 may include any number of light sources 335. In one embodiment, the case 300 may include 1 or more, or 2 or more, or 3 or more, or 4 or more, or 5 or more, or 6 or more, or 7 or more, or 8 or more, or 9 or more, or 10 or more, or 15 or more, or 20 or more or 30 or more, or 40 or more, or 50 or more, or 100 or more, or 1000 or more light sources. In another embodiment, the light sources 335 may be distributed and/or oriented in any configuration. For example, the light sources 335 may be distributed entirely on the second case portion 310. As another example, the light sources 335 may be distributed entirely on the first case portion 305.

While the light source 335, as illustrated, are rectangular, in other embodiments, the light sources 335 may have other shapes and sizes. In embodiments, the light sources 335 may have one or more shapes selected from circular, triangular, square, rectangular, pentagonal, hexagonal, heptagonal, octagonal.

The light sources 335 may emit light having any of a variety of colors. In one embodiment, the light sources 335 emit white or nearly white light. In another embodiment, the light source 335 emit red light. In another embodiment, the light sources 335 emit green light. In another embodiment, the light sources 335 emit blue light. In another embodiment, the light sources 335 emit yellow light. In another embodiment, the light sources 335 emit orange light. In another embodiment, the light sources 335 emit light having one or more colors selected from white, blue, green, yellow, orange, red, indigo, or violet.

With the case 300 dismounted from a portable electronic device, the first case portion 305 and the second case portion 310 may be separate case portions. The first and second case portions 305 and 310 may have electrical connectors (not shown) for creating an electric circuit having the light sources 335, the electrical connectors configured to mate with one another when the first and second case members 305 and 310 are mounted on a portable electronic device.

Figure 4:
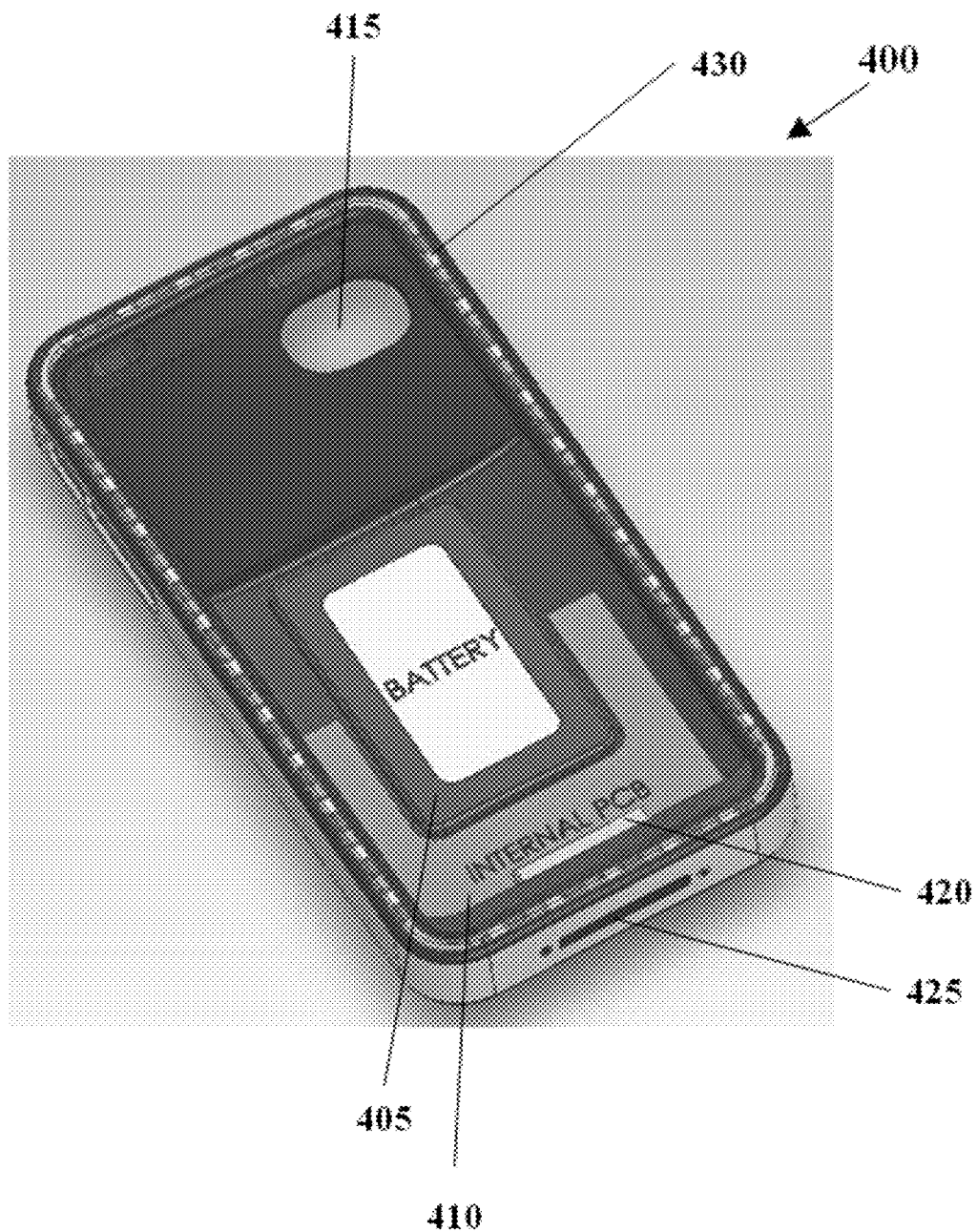
FIG. 4 is a perspective view of a case for a portable electronic device, in accordance with an embodiment of the invention.

FIG. 4 illustrates the back of a case for a portable electronic device. A case 400 for a portable electronic device may include a battery 405, an internal printed circuit board (PCB) 410, an opening 415 for a camera of the portable electronic device, a connector 420 for mating with an electronic interface (or power source) of the portable electronic device, an interface 425 for coupling to a power source or communications link, and a plurality of lighting members (or light sources) 430. The interface 425 may enable a portable electronic device to communicate with an external electronic device, such as another portable electronic device or computer system. The connector 420 may enable the case 400 to provide power from the battery 405 to the portable electronic device when the connector 420 has mated with an electronic interface of the portable electronic device.

The case 400 may be configured for use with a portable electronic device, such as a Smartphone, tablet personal computer ("PC"), or slate. For example, the case 400 may be configured for use with an Apple® iPhone® or iPad®, Android enabled phone or tablet PC, or a Microsoft® Windows Mobile® enabled phone or tablet PC.

The light sources 430 may be distributed around a rim portion of the case. The rim portion defines an opening for enabling a user to view a screen or display of a portable electronic device once the portable electronic device has been inserted into the case 400. The light sources may be configured to emit light of the same color or different colors, or light of varying frequencies (as described above) For example, the light sources 430 may all emit yellow or white light. As another example, each of the light sources may emit light of a different color. Further, the color of light emitted by the light sources 430 (either collectively or individually) may be controlled by software configured to control the light sources. That is, software may control the color emitted by all of the light sources 430, or by each individual light source (e.g., a first light source may be set to emit yellow light and a second light source may be set to emit blue light). Software may be installed on a portable electronic device operatively coupled to the case 400.

Light sources may emit light of varying frequencies (infrared, visible, ultraviolet) and intensities. For example, light source may emit red, orange, yellow, green, blue, indigo or violet light, or combinations of such colors of light.

The battery 405 may be a rechargeable, removable, replaceable or single-use battery. In one embodiment, the battery 405 may include chemistries selected from zinc-carbon, zinc-chloride, alkaline, oxy nickel hydroxide, lithium (e.g., lithium-copper oxide, lithium-iron disulfide, lithium-manganese dioxide), mercury oxide, zinc-air, silver oxide, nickel cadmium, lead acid, nickel metal hydride, nickel zinc and lithium ion. In another embodiment, the battery 405 may include an electrochemical cell. An electrochemical cell may include a fuel cell, such as, for example, a proton exchange membrane fuel cell or a high temperature fuel cell (e.g., solid oxide fuel cell, molten carbonate fuel cell). For example, the battery 405 may include a metal hydride fuel cell, electro-galvanic fuel cell, direct formic acid fuel cell, zinc-air fuel cell, microbial fuel cell, upflow microbial fuel cell, regenerative fuel cell, direct borohydride fuel cell, alkaline fuel cell, direct methanol fuel cell, reformed methanol fuel cell, direct ethanol fuel cell, proton exchange membrane fuel cell, flow battery or redox type fuel cell, phosphoric acid fuel cell, molten carbonate fuel cell, solid oxide fuel cell (e.g., tubular solid oxide fuel cell), protonic ceramic fuel cell, direct carbon fuel cell, planar solid oxide fuel cell, enzymatic biofuel cell, and magnesium-air fuel cell.

In some cases, a case may include one or more photovoltaic solar cells or PV modules for providing energy to a battery included in the case or a portable electronic device in electrical communication with the PV cell. The PV cell or module may capture solar energy and convert the solar energy to electrical current. Electrical current may subsequently be used to power the portable electronic device or charge (or re-charge) the battery.

The PV cell or module may be integrated into the case. For example, the PV cell or module may be provided on a surface of the case and in electrical communication with the battery, a connector for mating with an interface of the portable electronic device, or both. As another example, the case may be formed of a PV material, such as a flexible PV material that is molded into the shape of a case.

Lighting Devices and Modules

In another aspect of the invention, lighting devices for portable electronic devices are provided. In some situations, a lighting device may be mountable to a display portion of a portable electronic device. The electronic device may include a display adjacent to a front-facing camera of the portable electronic device. The lighting device may comprise one or more light sources for emitting light away from the display. The one or more light sources may be for emitting light at an illuminance of at least 1 lumen per square meter ("lux"). In one embodiment, the one or more light sources may be for emitting light at an illuminance of at least 10 lux, or at least 100 lux, or at least 1,000 lux, or at least 10,000 lux.

In some cases, a lighting device for a portable electronic device having a display and a camera may comprise a lighting member for mounting the display of the portable electronic device, the lighting member having one or more light sources for illuminating an object in line of site of the one or more light sources, such as, e.g., a user's face during use of the camera. The one or more light sources may provide light at an illuminance of at least 1 lux. The lighting device further comprises a power member for providing power to the one or more light sources.

The power member may be in electrical contact with a direct current ("DC") or alternating current ("AC") power source. Alternatively, the power member may be in electrical contact with an energy storage device, such as a battery. In some situations, the power member may be in electrical contact with a power source of the portable electronic device, or in electrical contact with one or more ports of the portable electronic device. For example, the power member may be in electrical contact with one or more universal serial bus ("USB") ports of the portable electronic device. As another example, the power member may be in electrical contact with one or more serial buses of the portable electronic device selected from USB and FireWire.

In another aspect of the invention, a lighting device for a portable electronic device having a display and a camera may comprise one or more light sources for illuminating a user's face during use of the camera. The one or more light sources may be for providing light at an illuminance of at least 1 lumen per square meter (lux). The lighting device may further include power member for providing power to the one or more light sources. The lighting device may be configured to mount to a display of the portable electronic device.

Figure 5A:
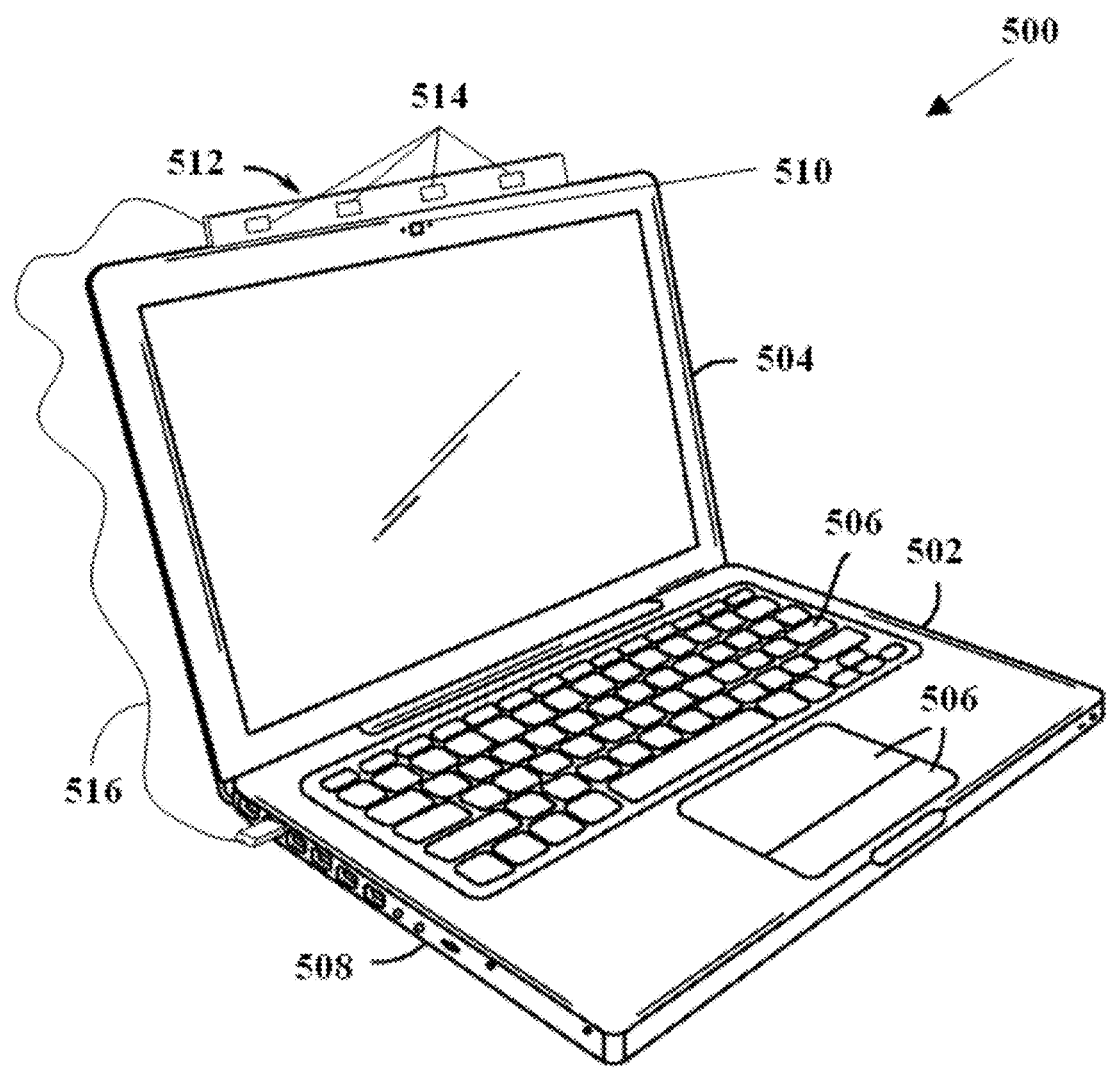
FIG. 5A illustrates a lighting device mounted on a portable electronic device, in accordance with an embodiment of the invention.

FIG. 5A shows a portable electronic device 500, in accordance with an embodiment of the invention. The portable electronic device 500 may be any portable computer, such as a laptop computer (e.g., Apple® Macbook® family of computers, Lenovo laptop, Dell laptop, Sony laptop, Toshiba Laptop), slate personal computer (PC) or tablet PC (e.g., Apple® iPad®, Blackberry Playbook, Motorola® Zoom). The portable electronic device 500 may include an enclosure (or housing) 502, a display 504, input structures 506, and input/output connectors 508. The input/output connectors 508 may include one or more serial buses, such as a universal serial bus or FireWire. The enclosure 502 may be formed from a polymeric material (e.g., plastic), metal, composite materials, or other suitable materials, or any combination thereof. The enclosure 502 may protect the interior components of the portable electronic device 500 from physical damage, and may also shield the interior components from electromagnetic interference (EMI).

The display 504 may be a liquid crystal display (LCD), cathode ray tube (CRT) or other suitable display type. In one embodiment, a suitable LCD may be based on light emitting diodes (LED) or organic light emitting diodes (OLED). In one embodiment, one or more of the input structures 506 may be configured to control the device 500 or applications running on the device 500. The portable electronic device 500 may include any number of input structures 506, including buttons, switches, a mouse, a control or touch pad, a keyboard, or any other suitable input structures. The input structures 506 may operate to control functions of the portable electronic device 500 and/or any interfaces or devices connected to or used by the portable electronic device 500. For example, the input structures 506 may allow a user to navigate a displayed user interface or application interface.

The device 500 may also include various input and output ports ("ports") 508 to allow connection of additional devices. For example, the device 500 may include any number of input and/or output ports 508, such as headphone and headset jacks, video ports, universal serial bus (USB) ports, IEEE-1394 ports, Ethernet and modem ports, and AC and/or DC power connectors. Further, the portable electronic device 500 may use the input and output ports 508 to connect to and send or receive data with any other device, such as a modem, external display, projector, networked computers, printers, or the like. For example, in one embodiment, the portable electronic device 500 may connect to a scanner, digital camera or other device capable of generating digital images (e.g., iPhone®, iPad®, Smartphone) via a USB connection to send and receive data files, such as image files. One or more of the ports 508 may be configured to provide power to an external device.

The device 500 may also include a camera 510. In the illustrated embodiment, the camera 510 is for taking one or more images or videos from one or more objects in front of the device 500 (i.e., the camera 510 may be a "front-facing" camera). The device 500 may include hardware and software for operating the camera 510 to collect one or more images and/or videos from objects in line of sight of the camera 510.

With continued reference to FIG. 5A, a lighting device 512 is shown attached to the portable electronic device 500, in accordance with an embodiment of the invention. The lighting device 512 can be separable from the portable electronic device 500. The lighting device 512 may be mounted to a top portion of the display 504. The lighting device 512 may include light sources 514 for providing light to one or more objects, such as one or more objects facing the lighting device 512. The light sources 514 may be light emitting diodes (LEDs) or organic LEDs (OLEDs), as described above. The lighting device 512 may be powered by a power source, such a direct current (DC) power source. In one embodiment, the lighting device 512 may be powered by the device 500 via one or more ports of the device 500 with the aid of one or more power cords connected to the one or more ports 508. In the illustrated embodiment of FIG. 5, the lighting device 512 is powered by a power cord 516 connected to a port 508 of the device. In one embodiment, the port 508 may be a USB or FireWire port. In another embodiment, the lighting device 512 may be powered by a plurality of ports 508, such as a plurality of USB ports. Alternatively, the lighting device 512 may be powered by a battery or photovoltaic (PV) module, or an external power source, such as an alternating current (AC) power source with the aid of an AC-to-DC converter (e.g., transformer) (as described above).

The lighting device 512 may include a mounting member (not shown) for mounting the display of the device 500. The mounting member may be include one or more of a magnetic material, a fastener (e.g., metal fastener, Velcro® fastener, polymer fastener), one or more screws or nails, and an epoxy or resin-type material. The mounting member may be configured to permanently or removably attaching the mounting member to the display of the device.

While the lighting device 512, as illustrated, may include four light sources 514, in other embodiments, the lighting device 512 may include any number of light sources 514. In one embodiment, the lighting device 512 may include one light source 514. In another embodiment, the lighting device 512 may include three light sources 514. In another embodiment, the lighting device 512 may include at least 5, or at least 6, or at least 7, or at least 8, or at least 9, or at least 10, or at least 15, or at least 20, or at least 50, or at least 100, or at least 1000 light sources 514. The light sources may be configured to have varying levels of illuminance (as described above).

The device 500 may include software for operating the lighting device 512. Such software may enable a user to turn the light sources 514 on and off at predetermined intervals, dime the light sources 514, or to synchronize providing power to the light sources 514 with taking a picture or video such that the light sources 514 turn on when a user desires to take a picture or video.

In some situations, the a lighting device 512 may be used with other electronic devices, such as desktop computers and/or computer displays coupled to desktop computers. For example, the lighting device may be for mounting to a display of a desktop computer, thereby providing lighting during use of a camera of the desktop computer. As another example, the lighting device 512 may be used with desktop computers in which the one or more central processing units (CPUs), other electronic components and the display are in a single unit (e.g., Apple® iMac).

In another aspect of the invention, a lighting device includes a jack connector for mating with a socket connector of a portable electronic device, a lighting member electrically coupled to the jack connector, and a connector electrically coupled to the jack connector, the connector for mating with another lighting device.

Figure 5B:
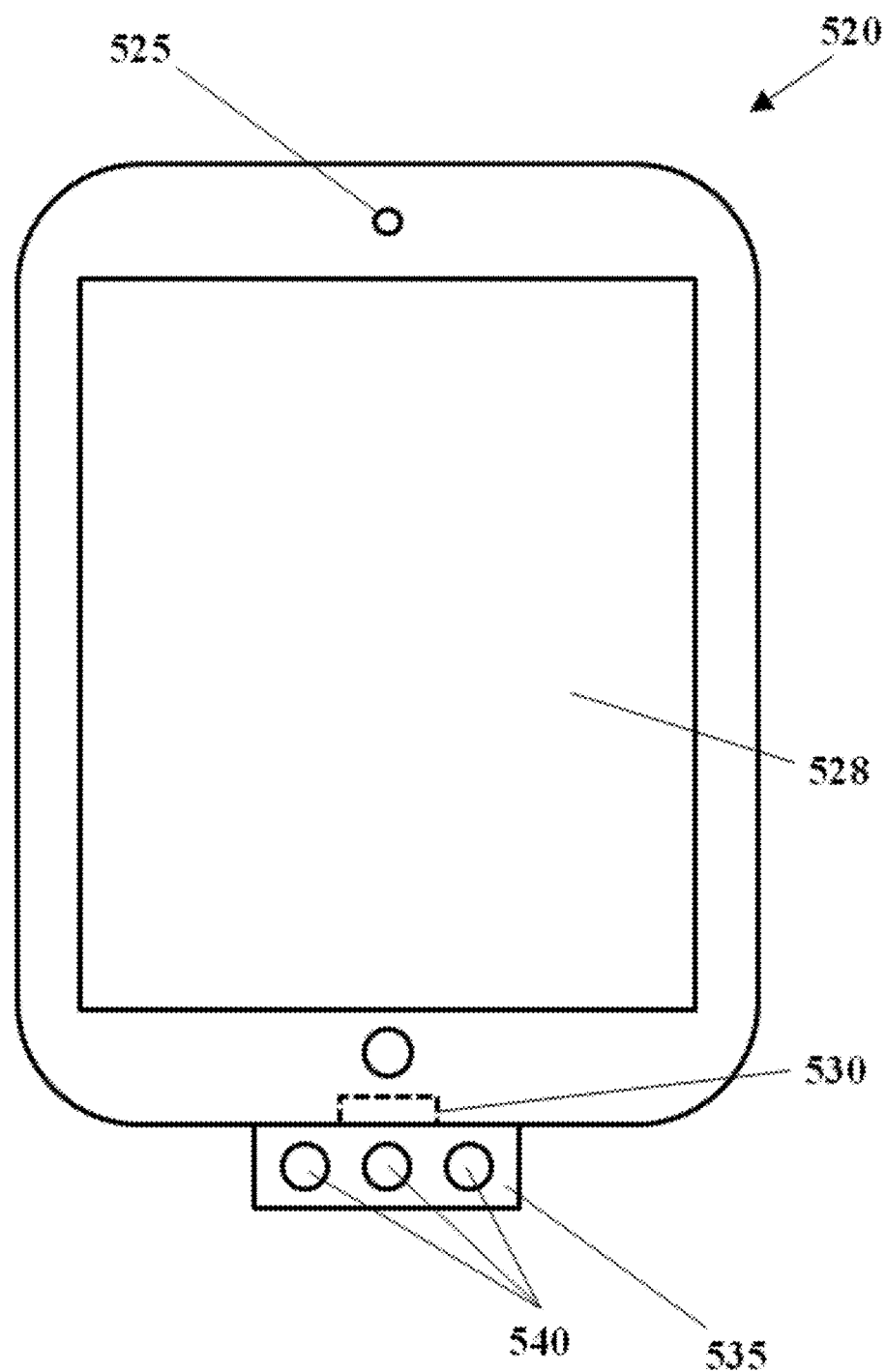
FIG. 5B illustrates a lighting device mounted on a tablet personal computer, in accordance with an embodiment of the invention.

In other cases, a lighting device is provided for use with a Smartphone (e.g., iPhone), or a slate or tablet PCs, such as, e.g., Apple® iPad®, Blackberry Playbook and Motorola Zoom. FIG. 5B shows a device 520 having a front-facing camera 525, a screen 528 and dock connector 530, in accordance with an embodiment of the invention. A lighting device 535 is shown mounted on a bottom portion of the device 520. The lighting device 535 may be used to illuminate a user or other object during use of the front-facing camera 525.

The lighting device 535 is mounted on (or attached to) the device 520. In some embodiments, the lighting device 535 is separable from the device 520. In some situations, the lighting device 535 is attached to the device 520 with the aid of the dock connector 530. In other situations, the lighting device 535 is attached to the device 520 with the aid of an attachment members, such as a clamp, clip or hook and loop fasteners (e.g., Velcro® strap).

The lighting device 535 includes an interface (e.g., power or communications chord) that mates with the dock connector 530 to provide power and/or enable the device 520 to communication with the lighting device 535. The lighting device includes a plurality of lighting members 540 (three shown), such as, for example, LEDs, but in other cases the lighting device 535 includes any number of lighting members, such as one lighting member, or five lighting members, or ten lighting members. The lighting members 540 are as described elsewhere herein. The lighting device 535 is configured to receive power from the device 520 via the dock connector 530. In some situations, the lighting device 535 is controlled by the device 520, such as by an application on the device 520, via the dock connector 530. In other situations the lighting device 535 is configured for OTA communication with the device 520. In some cases, the lighting device 535 includes onboard power (e.g., battery, fuel cell, photovoltaic module) for providing power to the lighting members 540.

Figure 6:
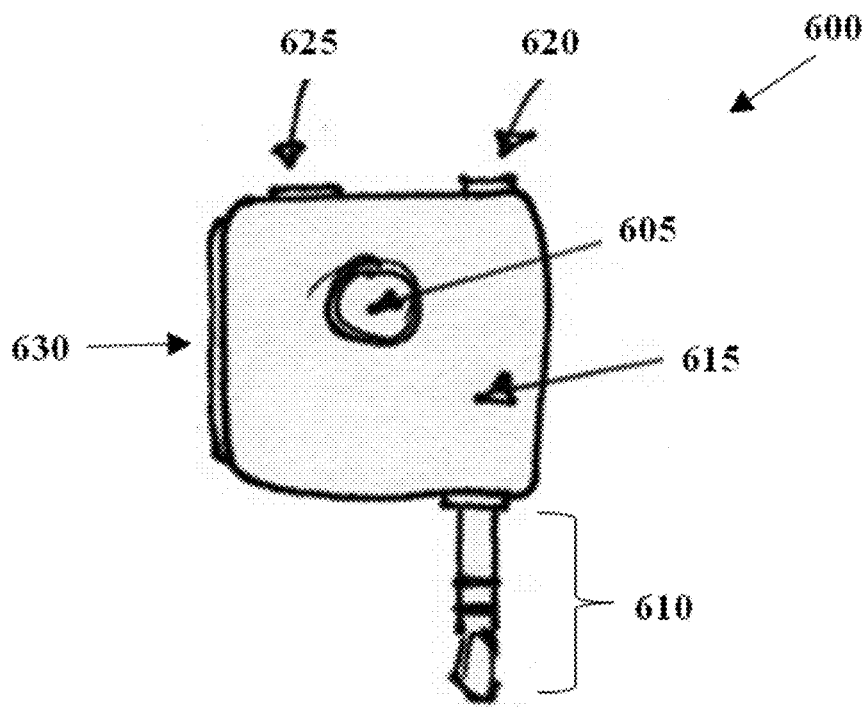
FIG. 6 schematically illustrates a lighting device, in accordance with an embodiment of the invention.

FIG. 6 shows a lighting device 600 having a lighting member 605, in accordance with an embodiment of the invention. The lighting member 605 may be a light emitting diode ("LED"). The lighting device 600 may include a connector for interfacing with a portable electronic device. The lighting device 600, as illustrated, includes a surface-mounted connector (also "jack" or "plug" herein) 610, which is for mating (or interfacing) with a female electrical contact or socket of a portable electronic device. The jack 610 may be a headphone-type jack or plug.

A jack may permit a portable electronic device to provide power to a lighting device. A jack may be a tip, ring, sleeve ("TRS") connector having three contacts for providing power to a lighting device and enabling user or software control of the lighting device with the aid of a portable electronic device electrically coupled to the lighting device. For example, one contact of the TRS connector may be for providing power to the lighting device, and another contact of the TRS connector may be for controlling intermittent lighting frequency, light intensity, light flashes, and whether lighting modules are in an 'on' or 'off' state. This may enable a user to time flashes (or short bursts) of light from the lighting device to a point in time in which a user desires to take a picture. Another contact of the TRS connector may permit a user to provide power to the portable electronic device in situations in which the lighting device includes a power source, such as a battery or other energy storage device.

The lighting device 600 may be used to illuminate the face of a user, for example, to take a picture of the user, have a video conversation with another user, or face time. In other cases, the lighting device 600 may be used to illuminate other users, for example, to enable a user to take pictures or videos of others.

The lighting device 600 may include a body 615 that may include one or more of a battery and printed circuit board (PCB). The lighting device 600 may further include a socket 620 for accepting a headphone connector (or jack) and a switch 625 to enable a user to turn the lighting device 600 "on" or "off". When the lighting device 600 is turned off, the lighting member 605 does not emit light. When the lighting device 600 is turned on, the lighting member 605 emits light. The switch 625 may be operatively coupled to a printed circuit board in the body 615, that may be in electrical communication with the lighting member 605 and the jack 610. The switch 625 may operate independently of any software, application or device. For example, if the lighting device 600 is communicatively coupled to software (e.g., iPhone® App), the switch 625 may enable a user to turn the lighting device 600 off even when software instructs the lighting device 600 to emit light. In some cases, the switch 625 may enable a user to adjust a power level of the lighting member 605, or to dim the lighting member 605.

With the lighting device 600 mounted on a portable electronic device, the jack 610 mates with a socket of the portable electronic device and a user may turn the lighting member 605 on or off with the aid of the switch 625. The jack 615 may permit the user to rotate the lighting device 600 any number of degrees with respect to its original position and along a rotational axis in a plane orthogonal to the lighting device 600.

The lighting device 600 may be customizable. For example, a surface opposite a surface having the lighting member 605 may include an area for text or images. In such a case, the surface may permit an individual, company or entity to include an image, representative text or logo of the individual, company or entity. As another example, the lighting device 600 may have a customizable color or skin. As another example, the lighting device 600 may include customizable branding.

The lighting device 600 may include a connector 630 for mating with other lighting devices. The connector 630 may permit a user to customize a lighting device to have various sizes, shapes and colors. In some embodiments, the connector 630 may permit a user to attach one or more other lighting devices to the lighting device 600. In such a case, the lighting device 600 may be modular. In some cases, a user may insert a jack of another lighting device into the socket 620 of the lighting device 600 to stack lighting devices.

The lighting device 600, as illustrated, includes one connector 630. However, the lighting device 600 may include at least 1, or at least 5 or at least 10 connectors.

The lighting device 600 may have a width (as measured along an axis orthogonal to an axis having the jack 610) from about 0.5 inches to 12 inches, a depth (as measured along an axis into the plane of the page) from about 0.05 inches to 5 inches, and a height (as measured along the axis parallel to the jack 610) from about 0.5 inches to 12 inches.

The lighting member 605 may have varying levels of illuminance, as described above. For example, the lighting member 605 may have an illuminance of at least about 1 lux, or at least about 2 lux, or at least about 3 lux, or at least about 4 lux, or at least about 5 lux, or at least about 6 lux, or at least about 7 lux, or at least about 8 lux, or at least about 9 lux, or at least about 10 lux, or at least about 50 lux, or at least about 100 lux, or at least about 500 lux, or at least about 1,000 lux, or at least about 50,000 lux, or at least about 10,000 lux.

In some situations, the lighting device 600 includes a connector suitable for mating with an electronic interface of a portable electronic device, such as a docking connector of a tablet PC, Smartphone, or other electronic device (e.g., Laptop computer, music player). In such a case, the jack 610 of the lighting device 600 is precluded and the lighting device 600 includes a connector suitable for mating with the docking connector of the portable electronic device.

In some embodiments, the lighting device 600 is communicatively coupled to a portable electronic device via wireless or wired communication, such as via over the air (OTA) communication (e.g., WiFi, Bluetooth) or wired communication, such as by way of a docking connector (e.g., jack 610). This permits the portable electronic device to communicate with the lighting device, such as to turn the lighting member 605 on and off, or to time supplying power to the lighting member 605 to take a picture or video. In some cases, the portable electronic device includes an application ("app") configured to communicate with the lighting member 600. The app may enable a user to turn the lighting member 605 on and off, or to use the lighting device 600 to provide lighting for still images or videos.

In some situations, the jack (or other connector) of the lighting device 600 is precluded and the lighting device supplies power to the lighting member 605 via an onboard power supply. In such a case, the lighting device 600 may mount a portable electronic device via a mounting member, such as a clip, and communicate with the portable electronic device via wired or wireless (e.g., OTA) communication.

Figure 7:
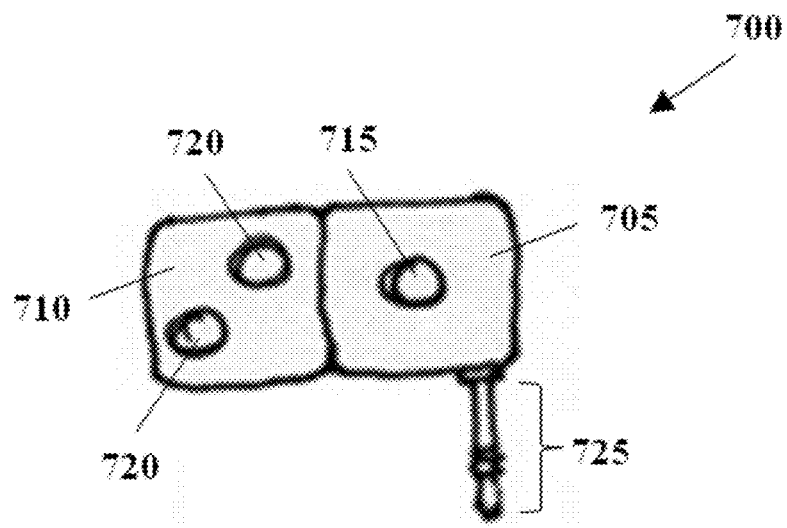
FIG. 7 schematically illustrates a lighting module, in accordance with an embodiment of the invention.

FIG. 7 illustrates how the lighting modules may be modular. With reference to FIG. 7, a lighting module 700 is shown having a first lighting device 705 attached (or operatively coupled) to a second lighting device 710, in accordance with an embodiment of the invention. The first lighting device 705 includes a first lighting member 715, and the second lighting device 710 includes second lighting members 720. An additional lighting device may be attached to the second lighting device 710. In some cases, the first lighting device 705 may include additional connectors for mating with a plurality of lighting devices. For example, the first lighting device 705 may include a connector on a side opposite the second lighting device 710 for mating with a third lighting device (not shown).

The first lighting device 705 and second lighting device 710 may have the same color or shape or different colors and shapes. For example, the first lighting device 705 may be black and the second lighting device 710 may be red. In addition, the first lighting device 705 and second lighting device 710 may have any number of lighting members. The first lighting device 705 may have 1 or more, or 2 or more, or 3 or more, or 4 or more, or 5 or more, or 10 or more, or 20 or more, or 30 or more, or 40 or more, or 50 or more lighting members 715. The second lighting device 710 may have 1 or more, or 2 or more, or 3 or more, or 4 or more, or 5 or more, or 10 or more, or 20 or more, or 30 or more, or 40 or more, or 50 or more lighting members 720.

In embodiments, the lighting module 700 may enable a user to construct (or piece together) lighting devices to form a lighting module (or power module, see below). This may enable a user to customize lighting devices as desired. Lighting devices of various shapes, sizes, colors, designs and lighting members (i.e., colors of light, frequency of emitted light, varying levels of illuminance) may be mixed and matched to provide a lighting module 700 having characteristics desired by a user. In addition, lighting devices of lighting modules may be formed of disposable material ("disposable"). For example, the user may couple two lighting device to form a lighting module having two lighting devices. In other cases, a user may couple up to 2, or up to 3, or up to 4, or up to 5, or up to 6, or up to 7, or up to 8, or up to 9, or up to 10, or up to 20, or up to 30, or up to 40, or up to 50, or up to 100, or up to 1000 lighting devices to form a lighting module. Lighting devices may be connected (or coupled) to one another in series, parallel, or a combination of serial and parallel connections.

In some cases, a lighting device may have an illuminance of at least about 1 lux, or at least about 2 lux, or at least about 3 lux, or at least about 4 lux, or at least about 5 lux, or at least about 6 lux, or at least about 7 lux, or at least about 8 lux, or at least about 9 lux, or at least about 10 lux, or at least about 50 lux, or at least about 100 lux, or at least about 500 lux, or at least about 1,000 lux, or at least about 50,000 lux, or at least about 10,000 lux. The illuminance of a lighting device may be a net illuminance of all lighting members (or light sources) of the lighting device. The illuminance of a lighting module may be a net illuminance of all lighting devices, including lighting members, of the lighting module.

Figure 8A:
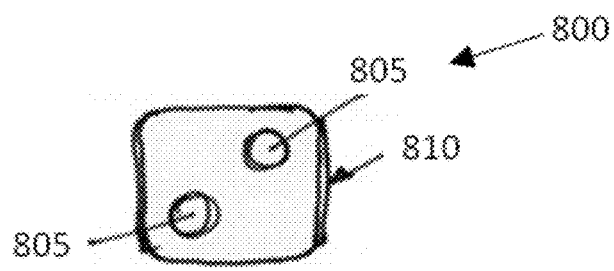
FIGS. 8A-8D schematically illustrate examples of lighting device, in accordance with various embodiments of the invention.
Figure 8B:
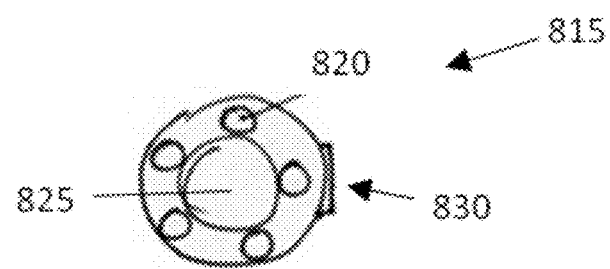
Figure 8C:
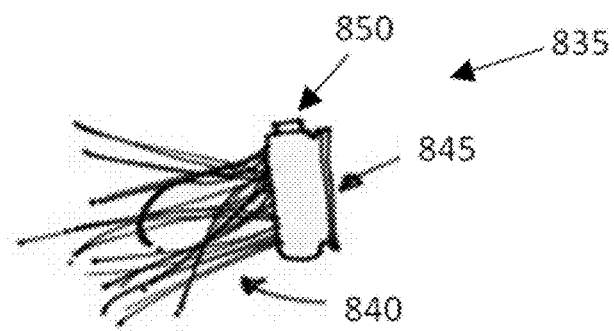
Figure 8D:
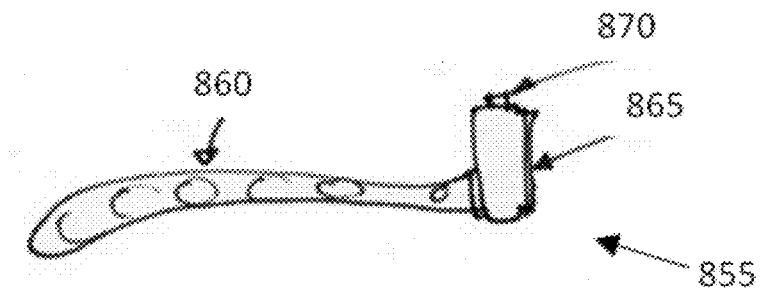

The lighting members of each of the lighting devices may have any shape, distribution and color. In some cases, lighting members may emit light having a wavelength (or frequency) in the infrared, visible or ultraviolet portions of the spectrum of light. FIG. 8 shows various examples of shapes and lighting configurations for lighting devices. FIG. 8A shows a lighting device 800 having two lighting members (e.g., LEDs) 805 and a connector 810 on each side of the lighting device. The connectors 810 may enable a user to connect the lighting device 800 to other lighting devices, such as, for example, in the manner shown in FIG. 7. FIG. 8B shows a ring-like lighting device 815 having lighting members (e.g., LEDs) 820 distributed around an opening 825. The ring-like lighting device 815 includes a connector 830 to permit a user to connect the lighting device to another lighting device. FIG. 8C shows a lighting device 835 having fiber optic lighting members, a connector 845 and socket 850 for mating with a jack (e.g., headphone jack). FIG. 8D shows a lighting device 855 having a lighting strip 860, a connector 865 and socket 870. The lighting strip 860 may be flexible to permit a user to mold or shape the lighting strip 860 into various shapes and configurations.

Lighting devices may have various shapes, sizes, colors and modularity. For example, lighting devices, such as the lighting device 600 of FIG. 6, may be circular, triangular, square, rectangular, pentagonal, hexagonal, heptagonal, octagonal, nanagonal, or decagonal. As another example, lighting devices may have shapes set after, or resembling, cartoon charters, animals, trees, plants, mushrooms, food, drinks, faces, or inanimate object (e.g., electronics, cars, planes). As another example, a lighting device may be formed of a moldable material, such as a polymeric material, enabling a user to mold or shape the lighting device to have a desirable shape or configuration. Lighting devices may have widths from about 0.5 inches to 12 inches, depths from about 0.05 inches to 5 inches, and heights from about 0.5 inches to 12 inches. Lighting modules may have a plurality of lighting devices modularized with the aid of various retention members, such as magnetic retention members, hooks (e.g., metal or polymer hooks), fasteners (e.g., metal, polymer or Velcro® fasteners). Retention members may be connectors that may enable a user to build lighting modules of various shapes and sizes. A connector, such as the connector 630 of FIG. 6, may be integrated into the body of a lighting device and used to connect a lighting device to another lighting device, thereby forming a lighting module.

Figure 9:
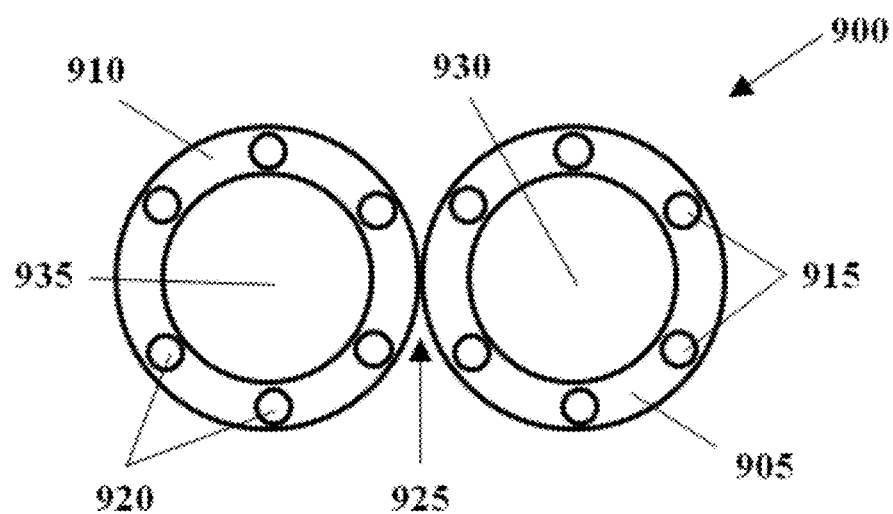
FIG. 9 schematically illustrates a lighting module, in accordance with an embodiment of the invention.

FIG. 9A shows a lighting module 900 having a first lighting device 905 and a second lighting device 910. The first lighting device 905 includes a plurality of lighting members 915 and the second lighting device 910 includes a plurality of lighting members 920. The first lighting device 905 and second lighting device 910 may each be a ring-like lighting device, such as, for example, the ring-like lighting device 815 of FIG. 8B. The first lighting device 905 and the second lighting device 910 may each include a connector to enable the first lighting device 905 to attach to the second lighting device 910. As illustrated, the first lighting device 905 is attached to the second lighting device 910 at an attachment point 925. The connector may be a magnetic connector (or magnetic assembly), which may permit a user to "snap" the second lighting device 910 onto the first lighting device 905. In some embodiments, the lighting devices may rotate at the attachment point. This may enable a user to orient one or more of the lighting devices 905 and 910 of the module 900 along various angles along an axis orthogonal to the plane of the page. For example, the first lighting device 905 may be oriented such the lighting members 915, when electrically coupled to a power source (e.g., a portable electronic device), may emit light out of the plane of the page and the lighting members 920 may emit light into the plane of the page.

A lighting device may include lighting members (or light sources) on one or more sides of the lighting device. For example, the first lighting device 905 or second lighting device 910 of the lighting module 900 of FIG. 9 may include light sources on a front and back portion of the lighting device. In some cases, a lighting device may include one or more light sources on side portions of the lighting device.

The lighting members 915 and 920 are disposed on body portions of the lighting devices 905 and 910, respectively. A body portion of the first lighting device 905 defines a first opening 930, and a body portion of the second lighting device 910 defines a second opening 935.

Figure 10:
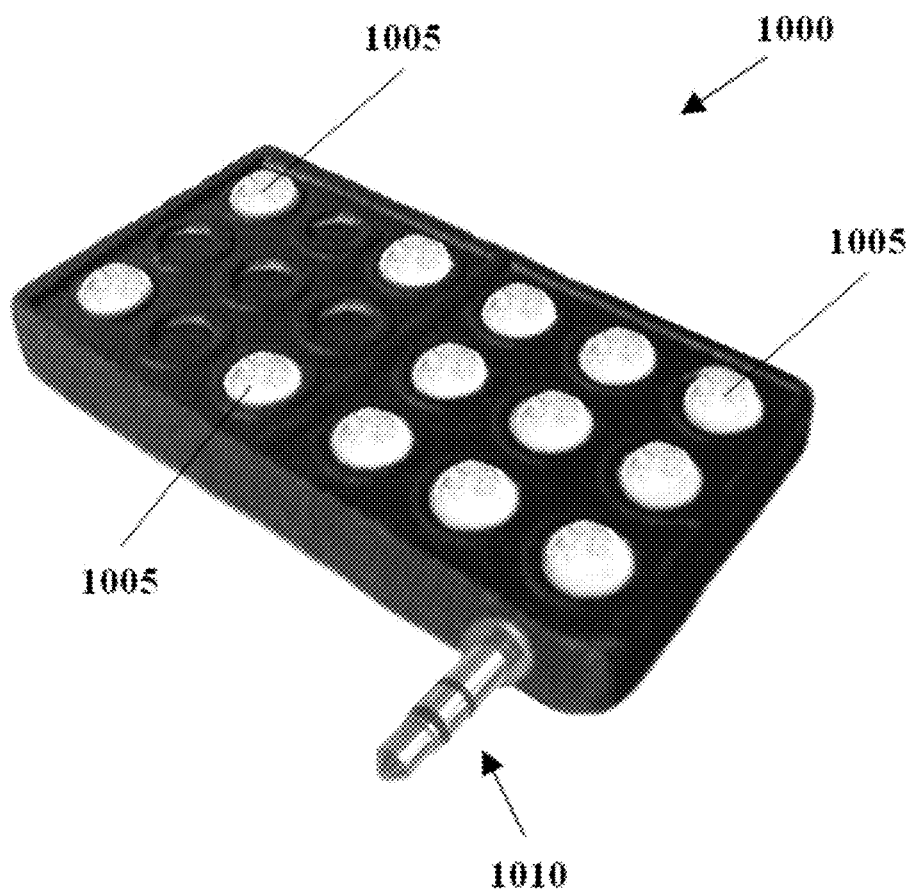
FIG. 10 schematically illustrates a power device, in accordance with an embodiment of the invention.

Lighting devices may have various shapes, sizes and configurations. In addition, lighting devices may have various numbers of lighting members (e.g., LEDs), sizes of lighting members and configurations of lighting members. With reference to FIG. 10, in an exemplary embodiment, a lighting device 1000 includes thirteen lighting members 1005, four lighting members 1005 disposed on one side of the lighting device 1000 and nine disposed on an adjacent side of the lighting device 1000. The lighting device 1000 includes a jack (or connector) 1010 for mating with a socket of a portable electronic device. The jack may enable the portable electronic device to provide power to the lighting device 1000 (as described above).

Power Devices and Modules

In another aspect of the invention, a power device comprises a jack connector for mating with a socket connector of a portable electronic device and a battery electrically coupled to the jack connector. The battery may be for providing power to or receiving power from a portable electronic device through the jack connector.

Figure 11:
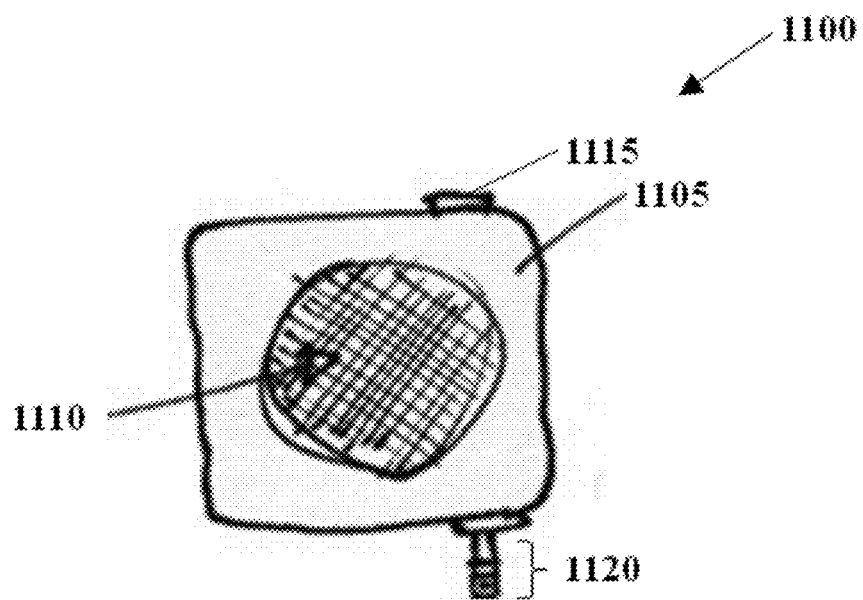
FIG. 11 illustrates an exemplary lighting device, in accordance with an embodiment of the invention.

With reference to FIG. 11, a power device 1100 includes a body 1105 having a button 1110, a battery (not shown) in the body 1105, a socket 1115 and jack 1120, in accordance with an embodiment of the invention. The power device 1100 may include a one or more lighting members, such as, for example, one or more LEDs. The jack 1115 may permit a user to couple the power device 1100 to a portable electronic device via a socket that is configured to mate with the jack 1115.

In one embodiment, the power device 1100 may provide power to (or "charge") a portable electronic device. In such a case, with the jack 1120 inserted into a socket of a portable electronic device, a user may press the button 1110 to provide power to the portable electronic device. In another embodiment, the power device may be configured to charge a battery of the power device, which may subsequently be used to provide power to various devices, such as, for example, one or more lighting devices or modules. In such a case, with the jack 1120 inserted into a socket of a portable electronic device, a user may press the button 1110 to charge the battery of the power device 1100.

Lighting devices may be coupled to power devices, such as the power device 1100. For example, a lighting device, such as the lighting device 600 of FIG. 6, may be inserted into the socket 1115 of the power device 1100. As another example, the power device may include a connector on a side portion of the power device to mate with another power device or lighting device, such as, for example, in the manner described in the context of FIG. 7.

In some cases, a power device may be coupled to another power device to form a power module. In other cases, a power device may be coupled to a lighting device to form a lighting module. The user may add other power or lighting devices to such modules to form lighting or power configurations as desired.

In some cases, a power device may be coupled to one or more other power devices in a serial fashion. This may enable a user to form a power module configured to provide a predetermined voltage output. For example, if a portable electronic device requires a 12 V power source and a power device is configured to output 3 V, a user may connect four power devices in series to provide a power module having an output of 12 V. In other cases, a power device may be coupled to one or more other power devices in parallel. This may enable a user to form a power module having a predetermined capacity. For example, if individual power devices have capacities of 1,200 mAh, a power module having two power devices connected in parallel may have a capacity of 2,400 mAh. In other cases, power devices may be connected in series and parallel to provide power modules having desirable (or predetermined) capacities and voltages.

Modularity of power devices may be achieved with the aid of connectors (or coupling members) in the power devices, which may enable a user to construct power modules by connecting a power device to another power device (or lighting device) using the connectors. In other cases, a user may construct a power module by connecting a power device to another power device using a jack of one power device and a socket of another power device. For example, the jack of one power device may be inserted into the socket 1115 of the power device 1100 of FIG. 11.

Lighting members (or light sources) provided herein may emit light continuously or intermittently. When intermittent, lighting members may emit light at a predetermined frequency. In some cases, lighting devices may be communicatively coupled to a portable electronic device having software for regulating one or more parameters of the lighting device. For example, software may regulate the intensity of light and the frequency (i.e., continuous or intermittent) at which the lighting device emits light.

Lighting devices provided herein may be communicatively coupled to portable electronic devices mounted by the lighting members. In some situations, lighting devices receive power via an onboard power supply (e.g., battery, fuel cell, photovoltaic module) and are in wired or wireless (e.g., OTA) communication with portable electronic devices. In some cases, this permits a portable electronic device to communicate with a lighting device, such as to turn a lighting member of the lighting device on and off, or to time supplying power to the lighting member to take a picture or video. In some cases, an application ("app") installed on the portable electronic device or part of the operating system of the portable electronic device is configured to communicate with the lighting member, which may enable a user to turn the lighting member on and off, or to use the lighting device to provide lighting for still images or videos.

In some situations, an over the air (OTA) protocol communicatively couples a portable electronic device to a lighting device. The OTA protocol enables an app of the portable electronic device to control the lighting device, such as to turn one or more lighting members of the lighting device on or off. The OTA protocol may be embedded in a hardware component of the portable electronic device of the lighting device.

In some cases, a lighting device configured for OTA communication with a portable electronic device automatically pairs with the portable electronic device. In an example, the lighting device 600 automatically pairs with a portable electronic device mounted by the lighting device 600. In such a case, OTA communication may be by way of Bluetooth or WiFi (or other wireless standards), and the portable electronic device may include an app for automatically detecting and syncing to the lighting device.

In some embodiments, lighting devices and cases described herein are configured to turn on and off (or perform other functions) in response to one or more user commands (or queues), such as verbal or visual commands. In an embodiment, a portable electronic device includes an app that is configured to recognize an incoming phone or video call by detecting a user-specific sound. The app may then turn the lighting device on for use in capturing an image or video and off after the image or video has been captured by the portable electronic device. In some situations, the lighting device pairs with the portable electronic device upon the detection and recognition of the one or more user commands.

Applications and User Interfaces

Another aspect of the invention provides computer applications (e.g., software) and user interfaces for use with lighting devices and systems. In some embodiments, user interfaces are provided for controlling lighting devices for use with electronic devices, such as portable electronic devices. User interfaces can be provided by way of machine-executable code stored on a memory location of a system or electronic device. The machine-executable code can be provided to an electronic device by way of software.

A user interface can be a graphical user interface (GUI), which in some cases can include one or more textual, graphical, and/or video components for display to a user. In an example, a GUI includes one or more graphical items for enabling a user to acquire an image or video with the aid of a camera (e.g., front-facing or back-facing camera) of an electronic device having the GUI.

In some embodiments, a user interface can be used to facilitate photography, video and video calling or chat from personal computers, laptops, tablets and mobile phones. In some cases, a GUI can improve the appearance of a user during video communication or for portrait (or still) photography. In an example, the GUI improves the brightness, image contrast, hue and/or saturation of an image. Such improvement can be made during image or video acquisition (i.e., in real time) or after image or video acquisition.

In some embodiments, a user interface and its associated software can be used with a lighting module, device or system, as described herein. The software can be installed on an electronic device, such as a portable electronic device. During installation, machine-executable code can be installed on a memory location of the electronic device.

In some cases, the user interface and lighting module can function independently of each other, but in other cases they can function synergistically. In an example, an application installed on a portable electronic device for facilitating image and/or video capture pairs with a lighting module. The pairing can be automatic and wireless, such as with the aid of Bluetooth, WiFi or AirPlay connectivity. An electronic device can include the requisite components (e.g., chipset) for the selected mode of wireless communication back to the phone, tablet, laptop or PC. In some embodiments, an application can integrate with third-party applications for video calling, chatting, and/or photography.

Figure 12:
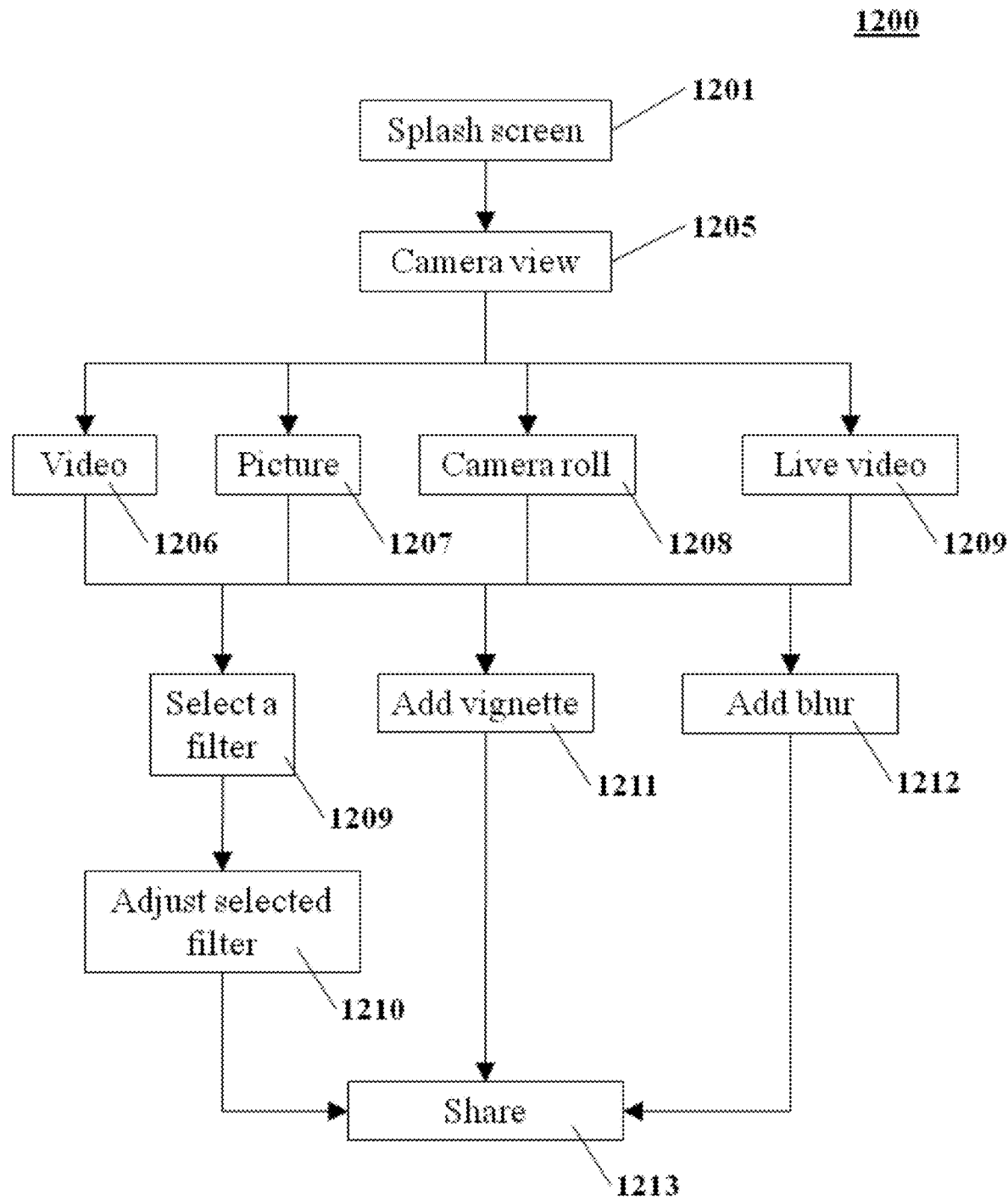
FIG. 12 shows a process flow, as can be implemented on a user interface provided herein, in accordance with an embodiment of the invention.

FIG. 12 shows a process flow 1200 as can be implemented on a user interface provided herein. A user is initially provided a splash screen 1201 on a display of an electronic device having the user interface. Next, under camera view 1205, the user is given the option to take a picture with a camera of the electronic device. In an example, the user is given the option to take a picture with either the front-facing or back-facing (or rear) camera. The user can select from a type (or mode) of image capture. For instance, the user can select to take a video 1206, take a picture 1207, view the camera roll 1208, or have a live video 1209. The live video can be used to chat with other users, for example. Upon selecting the type of image capture, the user is presented with options for adjusting the image. In an example, the user can select a filter 1209 and subsequently adjust the selected filter 1210. Alternatively, the user can add a vignette 1211 or add blur 1212. The user interface can enable the user to add other effects to the image or video. Next, following image capture, the user can share 1213 the image or video with other users.

A user interface can provide other image capture functionality. A "Super video" function can correct and enhances a live video stream and/or portrait pictures used or taken by the user. With this feature, the electronic device detects (e.g., auto detects, manually detects) the user's face and applies an image adjustment to the user's face versus the background. In some cases the correction is performed on the live video stream, such as, for example, on every frame or on select or predetermined frames in order to optimize capture speed and battery consumption. The live video stream can be captured using any camera of the electronic device, such as, for example, the front-facing or back-facing camera.

In some embodiments, the user interface provides various functionality and settings to adjust the quality of the video stream or picture. The user interface can include one or more sliders and settings to enable a user to adjust color balance, contrast, and/or sharpness of an image. Other features can enable a user to, for example, 1) set the intensity of an image or video, 2) adjust the color balance of an image or video, 3) turn on automatically if there is an incoming video call, 4) adjust lighting based on lighting conditions (e.g., outside or ambient light), 5) provide a battery consumption indicator, and 6) set battery mode (e.g., "Maximize battery life", "Best lighting possible"). The user interface can include pre-configured profiles (e.g., black and white, soft light) for matching the user's skin tone and/or adjusting the image for outside lighting conditions. In some cases, the user interface can enable a user to automatically create a lighting profile based on a portrait picture uploaded by user. The user interface can include branded pre-configured profiles that leverage famous (or otherwise well-known) cosmetics brands or famous photography studios (e.g., Studio Harcourt). In some cases, the user interface can include third-party video call or chat integration (e.g., Skype, FaceTime, Facebook, Twitter, Google+, Match.com) for automatic on/off and profile adjustment.

In some embodiments, the user interface includes integration for social network (e.g., Facebook, Twitter, Google+, Linkedin, Youtube) uploading of pictures and videos. In some cases, the user interface can enable a user to capture an image using lighting modules provided herein, enhance the image, and upload the image to a user's social network profile.

In some embodiments, a user interface is configured to enhance an image with the aid of lighting devices or modules provided herein. For instance, the user interface can time image or video capture such that lighting devices provided herein are turned on to provided image enhancement, such as to provide more light in poor or low lighting conditions. Alternatively, a user interface can provide in-application lighting to supplement or replace the lighting module. In some cases, the user interface includes one or more lighted objects (e.g., lighted strips) on a display of the electronic device or along an edge of the display. The lighted objects can be white rectangular strips, which can be provided on the display to enable enhanced lighting during image or video capture.

In some embodiments, the user interface operates as a control for a lighting device or module provided herein, allowing a user to set the intensity and color balance of the lighting provided and other relevant parameters of the module, such as, for example, 1) turning on automatically if there is incoming video call, 2) adjusting lighting based on outside or ambient lighting conditions, and 3) providing a battery consumption indicator and settings (e.g., "Maximize battery life", "Best lighting possible").

In some situations, a user is provided with a window showing the user's face as it is captured by the front camera of the electronic device, which can permit the user to adjust lighting parameters during or prior to image capture. This can advantageously provide instant visual feedback, permitting the user to enhance an image under various lighting conditions.

In some embodiments, the user interface can function as a vanity mirror, enabling the user to view the user's face with the aid of a camera of an electronic device having the user interface. The user interface can engage a lighting device or module provided herein (see, e.g., FIG. 2) to enhance the user's image. In some cases, a combination of parameters can be stored by the user as a profile to be selected or retrieved when desired.

In some embodiments, the user interface provides in-application lighting to supplement or replace illumination provided by lighting devices or modules provides herein. In some cases, the user interface includes a one or more lighted (or lightly colored) strips or select regions along one or more edge portions of a display of an electronic device. The one or more lighted strips can have a user-selected or otherwise predetermined or regulated brightness, which in some cases can vary based on lighting conditions, such as lighting conditions detected by a light sensor of the electronic device. The lighted strips in some cases can be included in a portion of the screen having the user interface, such as by way of white strips (e.g., a selected portion of the display having a white background). In other cases, the lighted strips are LED's (e.g., embedded or integrated LED's) that are formed in the screen. Such in-application lighting can be used with the vanity feature described above.

The strips can have various shapes and configurations. In some embodiments, the strips can be circular, oval, triangular, square, rectangular, pentagonal, hexagonal, octagonal, or nonagonal in shape, or partial or combinations of shapes thereof.

In an example, edges of the user interface (or screen) include white rectangular strips that are provided by the user interface to help improve lighting conditions. The white rectangular strips can be defined by a select portion of the user interface, such as a background of the user interface (e.g., white background). At least a portion of the remainder of the user interface can be darker in color (e.g., black) to provide improved lighting, such as via the difference in contrast. The white rectangular strips can be disposed at the periphery of the screen, which can enable the user to view other features of the user interface, such as the object in view of the camera. In some cases, in-application lighting supplements light provided by lighting devices or modules provided herein. The electronic device can use one or both of the lighting devices (or modules) and in-application lighting, as desired, to provide a level of illumination as required. In an example, light is provided by a light module coupled to an electronic device with a camera, and a user interface provided on a display of the electronic device turns white (or other light color) to further illuminate an object in view of the camera. Such in-application lighting as well as light provided by a lighting device or module can be provided simultaneously with a user taking a picture.

In an example, a user takes a picture of the user's face with an electronic device having a front-facing camera, and the screen (or display) of the electronic device turns white to help illuminate the user's face. As another example, the user wishes to use the front-facing camera and display as a mirror, and the user interface on the display provides white strips along edge portions of the user interface. In such a case, a lighting device coupled to the electronic device can provide further illumination.

In some cases, a user interface includes a dashboard having a settings panel to enable an electronic device (including a user interface) to pair with a lighting device over the air, and to secure such pairing to avoid interferences with other users. The dashboard can enable a user to control in-application lighting.

Figure 13:
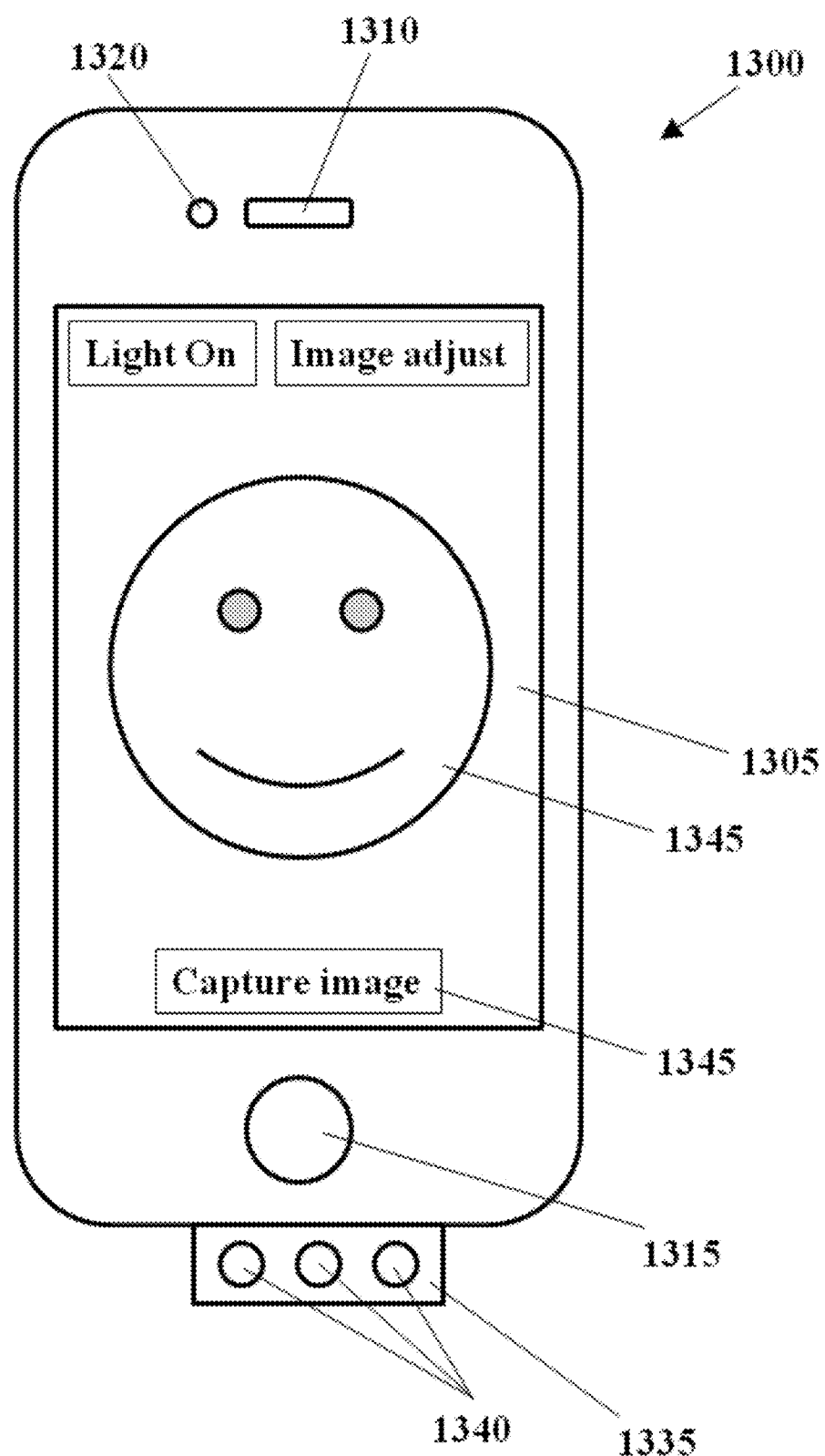
FIG. 13 shows a portable electronic device having a graphical user interface, in accordance with an embodiment of the invention.

FIG. 13 shows a portable electronic device 1300 having a display 1305, earpiece 1310, access button 1315 and camera 1320. In some cases, the display 1305 is a capacitive touch or resistive touch display. In an example, the portable electronic device 100 is an iPhone® or any Smartphone having a front-facing camera. The access button 1315 may be for accessing one or more features of the device 1300, such as a home screen of a user interface of the device 1300. The earpiece 1310 permits a user to communicate with another user in a telephonic conversation. The camera 1320 is disposed in a front portion of the electronic device 1300 (i.e., "front-facing" camera). A lighting device 1335 is attached to a connector of the portable electronic device 1300. The lighting device 1335 includes a plurality of lighting members 1340 (three shown), such as, for example, LEDs, but in other cases the lighting device 1335 includes any number of lighting members, such as one lighting member, or five lighting members, or ten lighting members. The lighting members 1340 are as described elsewhere herein. The lighting device 1335 is configured to receive power from the portable electronic device 1300, though in some cases the lighting device 1335 can include an onboard battery for providing power to the lighting device 1335.

The display 1305 include a user interface having graphical buttons (or icons) to enable a user to turn on ("Light on") the lighting members 1340 and adjust an image ("Image adjust") captured or to be captured by a camera of the portable electronic device 1300, such as the camera 1320. In the illustrated example, a user's face 1345 is displayed in the display 1305, and the user can select to take a picture or capture a video by selecting the image capture graphical button ("Capture image") on the user interface.

In some cases, the portable electronic device 1300 is configured to synchronize turning on the lighting member 1340 upon image (picture or video) capture. In such instances, power is supplied to the lighting members 1340 when the user elects to capture an image. In other cases, a user can turn the lighting members 1340 on or off as desired, such as with the aid of a graphical button on the user interface provided on the display 1305.

User interfaces described herein can be provided by way of a computer system having a display, such as a portable electronic device (see, e.g., FIG. 1). The system can include random-access memory (RAM) for enabling rapid transfer of information to and from a central processing unit (CPU), and to and from a storage module, such as one or more storage units, including magnetic storage media (i.e., hard disks), flash storage media and optical storage media.

Figure 14:
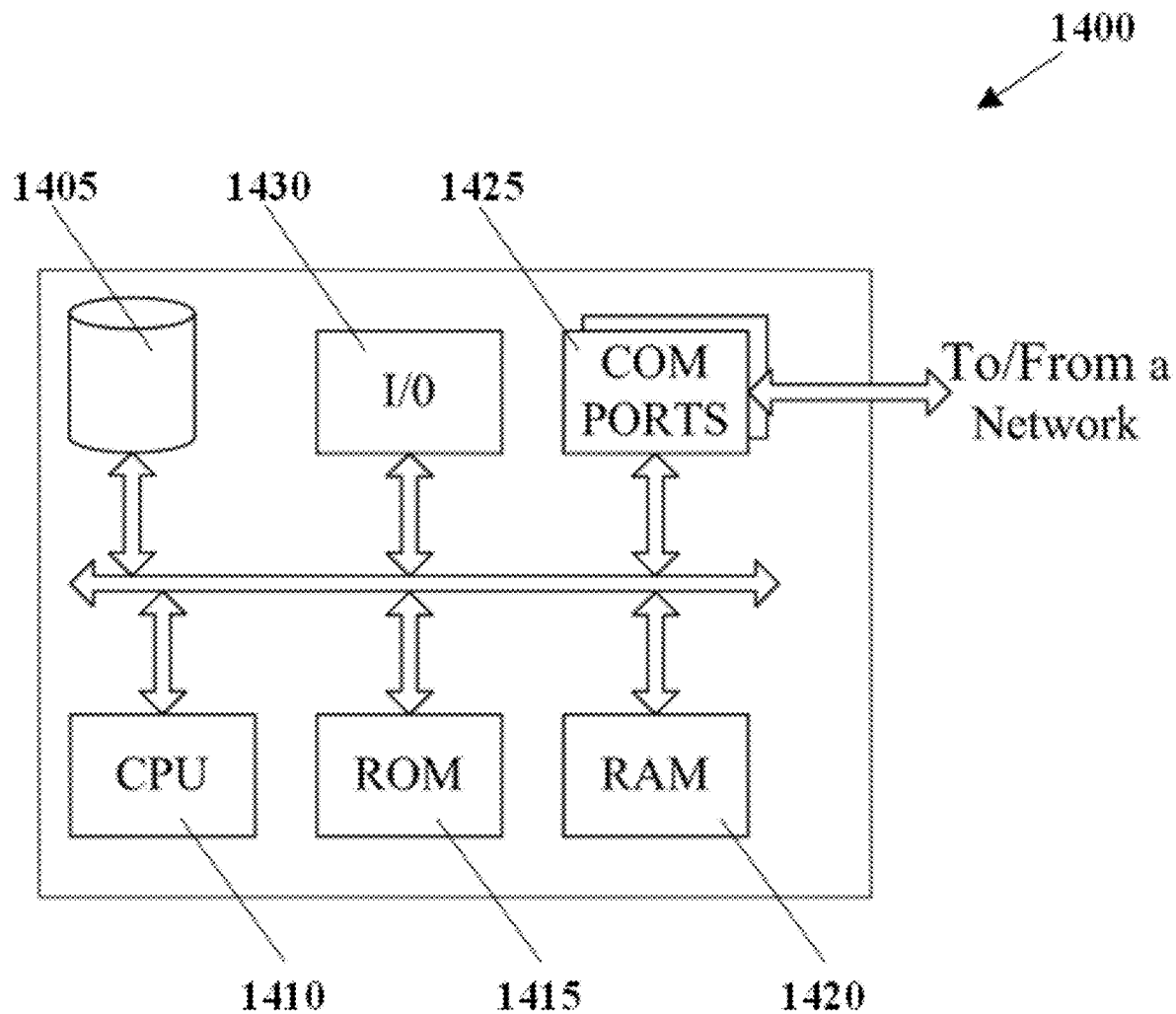
FIG. 14 shows a general purpose computer system configured for use with devices and systems provided herein, in accordance with an embodiment of the invention.

FIG. 14 shows a general purpose computer system 1400 configured for use with devices and systems provided herein. The system 1400 includes various components, such as a storage unit 1405, a central processing unit (CPU) 1410, read-only memory (ROM) 1415, random-access memory (RAM) 1420, one or more communication ports (COM PORTS) 1425, and one or more input/output (I/O) modules 1430, such as an I/O interface, a network interface for enabling the system to interact with an intranet, including other systems and subsystems, and the internet, including the World Wide Web. The storage unit can include one or more databases, such as a relational database. The components of the system 1400 can be interconnected.

In some cases, the system 1400 includes or is in communication with a server. A server, for example, can include a data communication interface for packet data communication. The server can also include a CPU, in the form of one or more processors, for executing program instructions. The server platform can include an internal communication bus, program storage and data storage for various data files to be processed and/or communicated by the server, although the server can receive programming and data via network communications. The hardware elements, operating systems and programming languages of such servers are conventional in nature, and it is presumed that those skilled in the art are adequately familiar therewith. Of course, the server functions can be implemented in a distributed fashion on a number of similar platforms, to distribute the processing load.

Hence, aspects of the methods outlined above can be embodied in programming. Program aspects of the technology can be thought of as "products" or "articles of manufacture" typically in the form of executable code and/or associated data that is carried on or embodied in a type of machine readable medium. "Storage" type media can include any or all of the tangible memory of the computers, processors or the like, or associated modules thereof, such as various semiconductor memories, tape drives, disk drives and the like, which can provide non-transitory storage at any time for the software programming. All or portions of the software can at times be communicated through the Internet or various other telecommunication networks. Such communications, for example, can enable loading of the software from one computer or processor into another, for example, from a management server or host computer into the computer platform of an application server. Thus, another type of media that can bear the software elements includes optical, electrical and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine readable medium can take many forms, including but not limited to, a tangible storage medium, a carrier wave medium or physical transmission medium. Non-volatile storage media include, for example, optical or magnetic disks, such as any of the storage devices in any computer(s) or the like, such as can be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media can be involved in carrying one or more sequences of one or more instructions to a processor for execution.

Example

FIGS. 15A-15G show examples of user interfaces, as can be used with lighting modules and systems provided herein. The user interfaces are implemented on a portable electronic device having a front-facing and back-facing camera, such as, for example, an iPhone 4S or iPad 2. The user interfaces are provided on a screen of the portable electronic device.

Figure 15A:
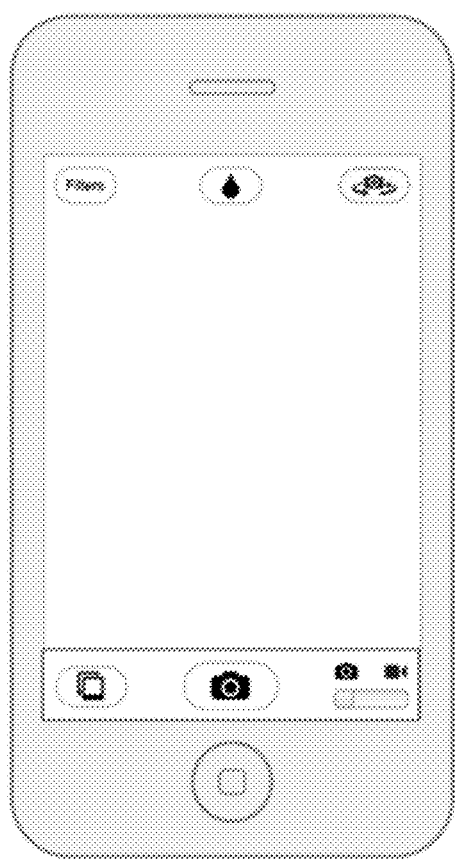

In FIG. 15A, under camera view, the application loads with the camera view on. A user can select which camera to use, such as the front-facing or back-facing camera. The user can user a slide at a bottom right-hand portion of the screen to select to capture a still picture or a video. The user interface enables the user to start filming a video or take a picture instantly. The user interface provides the user various filters for image adjustment (e.g., enhancement), in addition to other image manipulation features, such as vignettes and blur (e.g., a tile-shift effect). For instance, the user interface can permit the user to choose a filter to apply to a live image, or pick a vignette to apply to the camera view (i.e., the view of the object to the imaged), and subsequently to the picture or video.

Figure 15B:
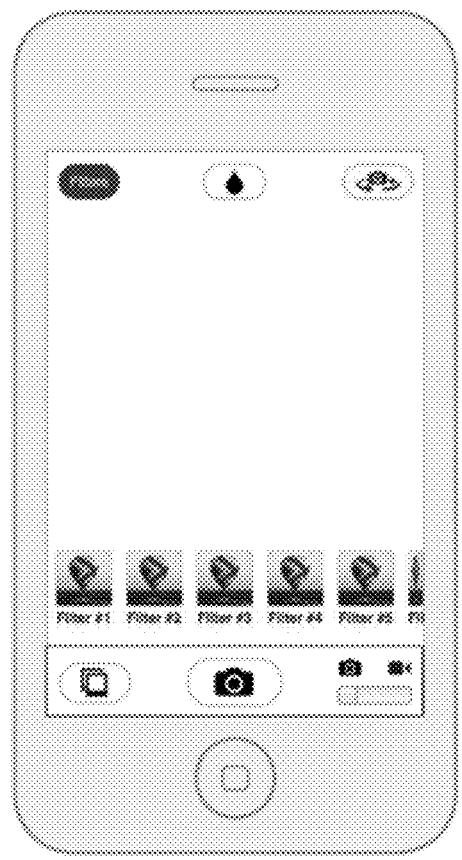

In FIG. 15B, the user has selected "Filters" from the screen of FIG. 15A. The user interface presents the user with various filter options (e.g., "Filter #1," "Filter #2) at a lower portion of the screen. Upon the user selecting a filter, the user interface applies the filter to the image on display on the screen of the portable electronic device. The user can then take a picture of video with the selected filter. The filters can apply various predetermined filter adjustment or enhancement algorithms to an image on display on the screen of the portable electronic device.

Figure 15C:
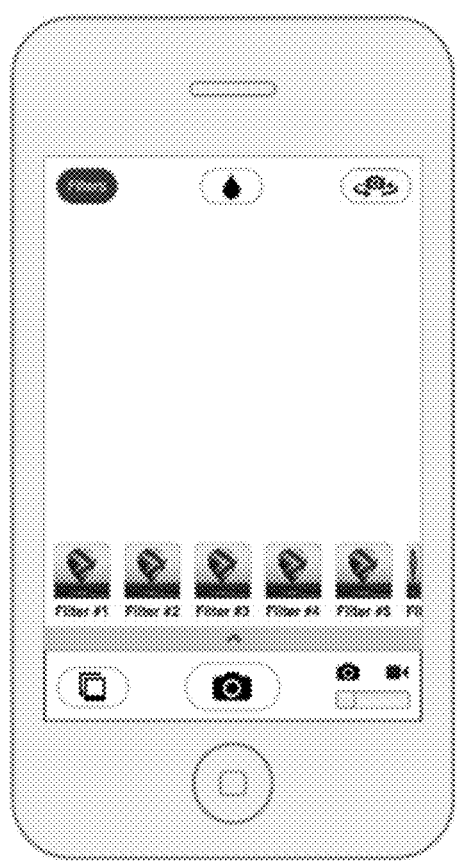
Figure 15D:
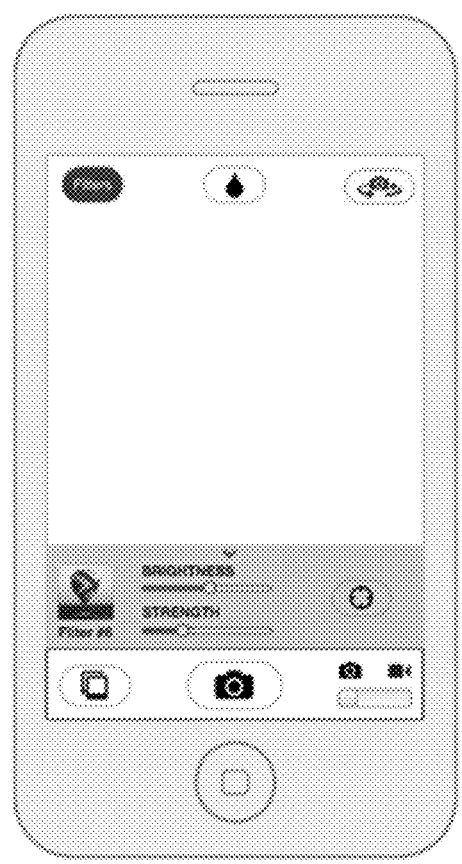

In FIG. 15C, once a user has selected a filter, the user interface presents the user with a pop-up menu item (^) for other image enhancement and/or adjustment options. With reference to FIG. 15D, the user has selected "Filter #6" and the pop-up menu item, and the user interface has presented the user with brightness ("Brightness") and strength ("Strength") sliders to further adjust the image on display on the screen of the portable electronic device. The strength slider increases (right) or decreases (left) the effect of the selected filter ("Filter #6). The user can then take a picture or video, or elect to select another filter or make other adjustments to the image.

In FIG. 15E the user can modify, transform and/or rotate a vignette effect by using the usual editing gestures, such as, for example, pinch-in to reduce the element, pinch-out to enlarge the element, rotating with both fingers, or dragging.

In FIG. 15F, the user can select the top-middle graphical icon to add a blur (tilt-shift) effect to the image in display, and to modify the blur effect, as desired, such as, for example, with the aid of gestures.

Figure 15G:

In FIG. 15G, the user can share an image captured with the aid of the portable electronic device. The user interface provides the user with various options, such as a social network (e.g., Facebook, Twitter), email settings, or online data or image repository (e.g., Flickr) settings. The user interface can enable the user to provide a caption to the image that has been captured or is to be captured. The user can upload (or "post") an image or video to a social network (e.g., Facebook, Google+), send the image or video to one or more email recipients, and/or transmit the image or video via a text message to one or more recipients.

Systems and methods provided herein can be used for still picture and video capture. In instants in which examples are described by way of image capture, such examples can be applied to video or live-stream video capture.

Cases, lighting devices and lighting members described herein may be combined with, or modified by, other devices and methods. For example, cases and lighting devices may be combined with, or modified by, cases provided by U.S. Pat. No. 7,782,610 to Diebel et al. ("PORTABLE ELECTRONIC DEVICE CASE WITH BATTERY"), which is entirely incorporated herein by reference.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A case configured to be removably attached to a smartphone, comprising:
   a back panel that substantially covers a back face of the smartphone when the case is attached to the smartphone;
   a rim extending from the back panel and defining a first opening configured and arranged so that when the case is attached to the smartphone, at least part of a display of the smartphone is visible by way of the first opening, and wherein the back panel comprises a second opening that is aligned with a rear-facing camera of the smartphone when the case is attached to the smartphone;
   a rechargeable battery in the case;

a power charging port for the battery; and a multiplicity of light sources secured on the case, the multiplicity of light sources including a plurality of light sources positioned along a perimeter of the first opening and adapted to illuminate part of an area to be imaged by a front-facing camera of the smartphone, and wherein at least some of the multiplicity of light sources are adapted to illuminate an area to be imaged by the rear-facing camera of the smartphone.

2. The case of claim 1, wherein the case is formed from a polymeric material.

3. The case of claim 1, wherein the light sources are light emitting diodes (LEDs).

4. The case of claim 3, wherein the light sources emit white light.

5. The case of claim 1, wherein the perimeter of the opening includes two long edges and two short edges, and at least some of the plurality of light sources are located along the two long edges.

6. The case of claim 5, wherein the plurality of light sources are spaced evenly along the two long edges.

7. The case of claim 5, wherein no light sources are located at least one of the two short edges.

8. The case of claim 5, wherein some of the plurality of light sources are located along the two short edges.

9. The case of claim 1, wherein the plurality of light sources are positioned in the rim of the case.

10. The case of claim 1, wherein a portion of the case that is configured to receive the smartphone has a single-piece construction.

11. The case of claim 1, wherein the plurality of light sources are attached to a surface of the case.

12. The case of claim 1, wherein the plurality of light sources are positioned in impressions in the case.

13. The case of claim 1, wherein the plurality of light sources are embedded in the case.

14. The case of claim 1, wherein the power charging port comprises a universal serial bus ("USB") port.

* * * * *